(12) United States Patent
Breeds et al.

(10) Patent No.: US 8,194,075 B2
(45) Date of Patent: Jun. 5, 2012

(54) METHOD AND SYSTEM FOR GENERATING AND DISPLAYING AN INTERACTIVE DYNAMIC LIST VIEW OF MULTIPLY CONNECTED OBJECTS

(75) Inventors: Robert J. Breeds, Swindon (GB); Philip R. Taunton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 12/243,894

(22) Filed: Oct. 1, 2008

(65) Prior Publication Data

US 2010/0083172 A1 Apr. 1, 2010

(51) Int. Cl.
*G06T 11/20* (2006.01)
(52) U.S. Cl. ...................................... 345/440
(58) Field of Classification Search ............. 345/440
See application file for complete search history.

(56) References Cited

U.S. PATENT DOCUMENTS

| | | |
|---|---|---|
| 5,136,690 A | 8/1992 | Becker et al. |
| 5,535,145 A | 7/1996 | Hathaway |
| 5,555,201 A | 9/1996 | Dangelo et al. |
| 5,596,703 A | 1/1997 | Eick et al. |
| 5,623,590 A | 4/1997 | Becker et al. |
| 5,699,255 A | 12/1997 | Ellis et al. |
| 5,835,085 A | 11/1998 | Eick et al. |
| 5,926,177 A | 7/1999 | Hatanaka et al. |
| 6,301,579 B1 | 10/2001 | Becker |
| 6,529,948 B1 | 3/2003 | Bowman-Amuah |
| 6,972,762 B2 | 12/2005 | Ben-Tovim et al. |
| 7,023,440 B1* | 4/2006 | Havekost et al. ............ 345/440 |
| 7,292,246 B2 | 11/2007 | Goldschmidt |
| 7,605,814 B1 | 10/2009 | Critz |
| 2002/0158887 A1 | 10/2002 | Samra et al. |

(Continued)

FOREIGN PATENT DOCUMENTS

WO 01 27878 4/2001

OTHER PUBLICATIONS

Athanasios Douitsis and Dimitrios Kalogeras; Interactive Network Management Visualization with SVG and AJAX; 2006; LISA '06 Proceedings of the 20th conference on Large Installation System Administration; Publisher USENIX Association Berkeley; pp. 233-245.*

(Continued)

*Primary Examiner* — Jeffery A Brier
(74) *Attorney, Agent, or Firm* — Kenneth L. Sherman, Esq.; Michael Zarrabian Esq.; Sherman & Zarrabian LLP

(57) ABSTRACT

A method and system for generating views of data on a user interface in a computing environment, is provided. One implementation involves: at a server, generating coordinate data for a graph representing multiply connected objects; transmitting the coordinate data to a client as lightweight object data; at the client, based on the lightweight object data, rendering an interactive dynamic graph view of the multiply connected objects on a user interface; at the client, based on the lightweight object data, rendering an interactive dynamic list view of the multiply connected objects on a user interface; and synchronizing the list view and the graph view. The order of objects in the list view reflects the order of objects in the graph view per a breadth-first traversal starting at a root object.

16 Claims, 24 Drawing Sheets

U.S. PATENT DOCUMENTS

| | | |
|---|---|---|
| 2004/0181544 A1 | 9/2004 | Anderson |
| 2005/0015377 A1 | 1/2005 | Wan |
| 2005/0131927 A1 | 6/2005 | Fildebrandt et al. |
| 2005/0138057 A1 | 6/2005 | Bender et al. |
| 2005/0177790 A1* | 8/2005 | Molander et al. ............. 715/700 |
| 2006/0059461 A1 | 3/2006 | Baker et al. |
| 2006/0075387 A1 | 4/2006 | Martin et al. |
| 2006/0150169 A1 | 7/2006 | Cook et al. |
| 2006/0173957 A1 | 8/2006 | Robinson et al. |
| 2006/0265664 A1 | 11/2006 | Simons et al. |
| 2007/0022000 A1 | 1/2007 | Bodart et al. |
| 2007/0226314 A1 | 9/2007 | Eick et al. |
| 2008/0005677 A1 | 1/2008 | Thompson |
| 2008/0040367 A1 | 2/2008 | Bitonti et al. |
| 2008/0059889 A1 | 3/2008 | Parker et al. |
| 2010/0079459 A1 | 4/2010 | Breeds et al. |
| 2010/0079460 A1 | 4/2010 | Breeds et al. |
| 2010/0079461 A1 | 4/2010 | Breeds et al. |
| 2010/0079462 A1 | 4/2010 | Breeds et al. |

OTHER PUBLICATIONS

Eick, S. G. et al., "Thin Client Visualization," IEEE Symposium on Visual Analytics Science and Technology 2007, Oct. 2007, pp. 1-13, Sacramento, CA.

yWorks GmbH, "yWords-yEd/yFiles API," http://www.yworks.com/en/index.html, Aug. 2006, 1 page, USA.

Ilog, Inc., "ILOG-Visualisation Server," http://www.ilog.com/products/server/, Aug. 2000, 1 page, USA.

Olsson, T., "CSS Diagrams or Things to Do With CSS When Your Bored at Work or Look Ma'—No Images," Dec. 2003, pp. 1-9, http://www.surfare.net/~toolman/temp/diagram.html.

Rubin, D. L. et al., "Protégé: A Tool for Managing and Using Technology in Radiology Applications," Journal of Digital Imaging, Aug. 9, 2007, pp. 34-46, Stanford, CA.

Goyal et al., "RDF Gravity (RDF Graph Visualization Tool)," Knowledge Information Systems Group, Salzburg Research, Austria, Sep. 2004, 12 pages.

Huang et al., "A Framework of Filtering, Clustering and Dynamic Layout Graphics for Visualization," 28th Australasian Computer Science Conference (ACSC2005), Jan. 2005, pp. 87-96, University of Newcastle, Australia.

Lee et al., "InfoVis 2004: Understanding Eight Years of InfoVis Conferences using PaperLens," Proceedings of the IEEE Symposium on Information Visualization 2004, Nov. 2004, 7 pages.

Sprague, Alan P., "A Parallel Algorithm to Construct a Dominance Graph on Nonoverlapping Rectangles," International Journal of Parallel Programming, Springer, Netherlands, May 1992, pp. 303-312, vol. 21, No. 4.

Lin, Y.T., "A Customizable SVG Graph Visualization Engine," Oct. 2007, 9 pages, http://web.archive.org/web/20071012164019/http://www.svgopen.org/papers/CustomizableSVG-GraphVisualizationEngine/, Victoria, CA.

AbsInt Angewandte Informantik GmbH, "aiSee: Command Line Options," May 16, 2007, 3 pages, http://www.aisee.com/options/6.htm.

Kim et al., "A Graph of Change Impact Analysis for Distributed Object-Oriented Software," 1999 IEEE International Fuzzy Systems Conference Proceedings, Aug. 1999, pp. 1137-1141, vol. 2, Seoul, South Korea.

Fyson, J. M. et al., "Using Application Understanding to Support Impact Analysis," Journal of Software Maintenance: Research and Practice, Mar. 1998, pp. 93-110, vol. 10, Issue 2, John Wiley & Sons, Ltd., New York, NY.

Barros, S. et al, "Supporting Impact Analysis: A Semi-Automated Technique and Associated Tool," Proceedings of the 11th International Conference on Software Maintenance, Oct. 1995, pp. 42-51, Opio, France.

Netisopakul, P., "Visualizing Dynamic Objects in Object-Oriented Program," SCI 2003. 7th World Multiconference on Systemics, Cybernetics, and Informatics Proceedings, 2003, pp. 321-325, vol. 13, IIIS, Orlando, Florida. (Abstract only).

The Eclipse Foundation, "ispace—A Scalable Dependency Visualization System for Java," discussed at http://www.eclipseplugincentral.com/Web_Links-index-req-viewlink-cid-843.html, web page titled Eclipse Plugins Central; Jan. 10, 2007, 3 pages.

ispace Team, "ispace:lspace—User Guide Browse," Jan. 2007, 4 pages, http://ispace.stribor.de/index.php?n=lspace. UserGuide.

Marshall, M.S. et al., "An Object-Oriented Design for Graph Visualization," Software: Practice and Experience, Jul. 2001, pp. 739-756, vol. 31, No. 8, John Wiley & Sons, Ltd., New York, NY.

Lutz, R.R. et al., "Bi-directional Analysis for Certification of Safety-Critical Software," Proceedings of the International Software Assurance Certification Conference (ISACC '99), 1999, pp. 1-9, ISACC, United States.

U.S. Non-Final Office Action for U.S. Appl. No. 12/243,883 mailed Jul. 8, 2011.

U.S. Non-Final Office Action for U.S. Appl. No. 12/243,899 mailed Jul. 21, 2011.

U.S. Non-Final Office Action for U.S. Appl. No. 12/243,902 mailed Aug. 12, 2011.

U.S. Non-Final Office Action for U.S. Appl. No. 12/243,909 mailed Aug. 29, 2011.

U.S. Final Office Action for U.S. Appl. No. 12/243,883 mailed Nov. 1, 2011.

U.S. Final Office Action for U.S. Appl. No. 12/243,899 mailed Nov. 1, 2011.

U.S. Final Office Action for U.S. Appl. No. 12/243,902 mailed Dec. 13, 2011.

U.S. Final Office Action for U.S. Appl. No. 12/243,909 mailed Dec. 13, 2011.

U.S. Advisory Action for U.S. Appl. No. 12/243,883 mailed Jan. 6, 2012.

U.S. Advisory Action for U.S. Appl. No. 12/243,899 mailed Jan. 6, 2012.

* cited by examiner

WSDL Documents

This is the collection of WSDL documents present in the registry.

⊞ Preferences

| Select | Name ◊ | Graph | Description |
|---|---|---|---|
| ☐ | Address.wsdl | ⊟ | |
| ☐ | AmazonWebServices.xml | ⊟ | |
| ☐ | basic.wsdl | ⊟ | |
| ☐ | BigEcho.wsdl | ⊟ | |
| ☐ | Echo.wsdl | ⊟ | |
| ☐ | Echo2.wsdl | ⊟ | |
| ☐ | Echodbcs.wsdl | ⊟ | |
| ☐ | Export1 BigEchoHttp Service.wsdl | ⊟ | |
| ☐ | LibraryBookManager.wsdl | ⊟ | |
| ☐ | SOAP HTTP Export BigEchoHttp Service.wsdl | ⊟ | |
| ☐ | SOAP JMS Export BigEchoJms Service.wsdl | ⊟ | |
| ☐ | ValidateInsurancePolicyBinding.wsdl | ⊟ | |
| ☐ | ValidateInsurancePolicyInterface.wsdl | ⊟ | |
| ☐ | ValidateInsurancePolicyProductionService.wsdl | ⊟ | |
| Total: 14 | | | |

FIG. 3

WSDL Document                                              ? −

WSDL Documents > Address.wsdl

Details of the Address.wsdl WSDL document.

| Details | Content | Impact Analysis | Governance |

General Properties

Name
Address.wsdl

Location
Address.wsdl

Description

Namespace
http://address.jaxrpc.samples

Owner
UNAUTHENTICATED

Version

Last modified
Thursday, 20 September 2007 11:10:39 B

Encoding
UTF-8

[Apply] [OK] [Reset] [Cancel]

Additional Properties

- Port Types
- Bindings
- Services
- Properties

Relationships

- Graphical View
- Imported Schemas
- Included Schemas
- Imported WSDLs
- Policies
- Policy Attachments
- Custom Relationships
- Classifications

METHOD AND SYSTEM FOR GENERATING AND DISPLAYING AN INTERACTIVE DYNAMIC LIST VIEW OF MULTIPLY CONNECTED OBJECTS

BACKGROUND OF THE INVENTION

1. Field of the Invention

The invention relates generally to graphical display of data, and in particular, to displaying a graph view of multiply connected objects.

2. Background Information

Visualization of and interaction with data helps users quickly understand the types of data available and their interrelationships. Often, sets of data are presented as lists, or tables with columns, depicting specific attributes of each instance of data. Analyzing and understanding the nature and state of units of data, and appreciating any subtle relationships and connections therebetween, can be difficult and time consuming. For example, in a screen display, large sets of textual data cannot fit on a single display without the user having to scroll or page, whereby a user cannot retain a view of all the data at once. A conventional solution is to draw a graph of objects with lines indicating relationships between pairs of objects, and some arbitrary shape representing each instance of an object. Typically, the scale of the graph can be controlled, and the data arranged in such a way that all data or a selection of data can be viewed in a single screen. An example of this is a unified modeling language (UML) editor, which allows users to examine a set of object classes and the relationships between them. The user can move around the graph, zoom into items of interest and view details of specific classes (e.g., zoom into objects in the graph and identify relationships that exist between classes).

When interacting with a graph, a common technique is to select an object, or objects, and then apply some function to them (e.g., adding an attribute that indicates that the status of the selected objects is "approved"). Similarly, to redraw the graph from a different root object, a user may select the new object, and select a function to redraw. When an object or a connector line is selected, it is typically highlighted or enhanced in some visual manner. In a graph, where it is not possible to provide the ability to tab between different objects and perhaps read out the object details using screen reader technology, navigating the graph to select which objects for application of functions is difficult for a user with restricted view of the graph (e.g., due to vision impairment).

Drawing graphs requires the ability to analyze the relationships between data objects and calculate the coordinates of each data object in a display that is easy to comprehend. Various solutions exist to draw datasets as graphs. An approach for drawing object graphs in a browser client is to use Cascading Style Sheets (CSS) to display HTML elements as boxes, connected by lines. Arrow heads are simulated by using a scheme with beveled outline styles. The entire graph can be represented by normal HTML elements, and with a suitable style sheet applied, the elements can appear as a visual graph. This is efficient in terms of storage and memory requirements, portable across different browsers, and is accessible by screen readers, due to the textual nature of the data definitions. This is suitable for simple graphs, but it would not easily apply to more densely populated object graphs where multiple intersecting connections occur between objects. It would also not easily lend itself to scaling and graphical transformations. There are browser differences in CSS compliance that need to be considered.

Understanding the contents and structure of a graph is simplified when all the elements and relationships between them are visible to the user. The user can quickly select any element and perform some action on it. However, if the view of the graph elements is restricted in some way, navigating and selecting graph elements is difficult and confusing. This is exacerbated when the graph is very dense with many intersecting connections obscuring the structure, or the user may have chosen to inspect a subset of the graph, (by zooming into an area), or the user may be unable to see the graph at all because of a vision impairment.

Screen readers are available for reading text being displayed. However, this technology is often specific to a particular operating system, browser, or programming environment. In a web browser environment, screen readers may be unable to read text that is rendered in a graph using vector graphics technology, such as Scalable Vector Graphics (SVG) or Vector Markup Language (VML).

SUMMARY OF THE INVENTION

The invention provides a method and system for generating views of data on a user interface in a computing environment. One embodiment comprises a process including: at a server, generating coordinate data for a graph representing multiply connected objects; transmitting the coordinate data to a client as lightweight object data; at the client, based on the lightweight object data, rendering an interactive dynamic graph view of the multiply connected objects on a user interface; at the client, based on the lightweight object data, rendering an interactive dynamic list view of the multiply connected objects on a user interface; and synchronizing the list view and the graph view.

Synchronizing the list view and the graph view may further include: in response to a change in an object in the graph view, changing a corresponding entry in the list view accordingly to reflect the change in the graph view such that the views are synchronized; and in response to a change in an object in the list view, changing a corresponding entry in the graph view accordingly to reflect the change in the list view such that the views are synchronized.

The process may further include: at the client, receiving user input for selecting a view object as an object of focus, and displaying content of the selected object on the user interface, and receiving user input for navigating through the multiply connected objects in a view.

The process may further include: at the server, retrieving data units and data unit relationships from a data source, then generating coordinate data for a graph including data objects representing the data units, and connections between the objects representing the corresponding data unit relationships; at the server, transforming the coordinate data to a client to lightweight object data for transmission to the client; at the client, based on the lightweight object data, rendering an interactive dynamic graph view of the multiply connected objects, wherein the graph includes visual elements connected by edges, such that the visual elements represent the objects and the edges represent relationships between the objects; and at the client, based on the lightweight object data, rendering an interactive dynamic list view of the multiply connected objects, wherein the list includes visual elements, including textual labels, and arrangement of such visual elements, such that the list of visual elements represent the objects and the arrangement may represent relationships between the objects or indicate the relative position of objects. An embodiment involves maintaining a list of objects starting with the root object, and traversing the graph from the root in a breadth-first order, listing the objects as they are processed. Adjacent objects in the list may or may not be connected by a relationship.

The computing environment may comprise service-oriented architecture and the data source comprises a service registry. The client may comprise a web browser on a thin client computing module, the server may comprise a server application on a server computing module, wherein the client module and the server module may be connected via a communication link.

These and other features, aspects and advantages of the invention will become understood with reference to the following description, appended claims and accompanying figures.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIGS. 3-12 show examples of generating and interacting with a graph view, according to embodiments of the invention.

DESCRIPTION OF THE PREFERRED EMBODIMENTS

Figure 1:
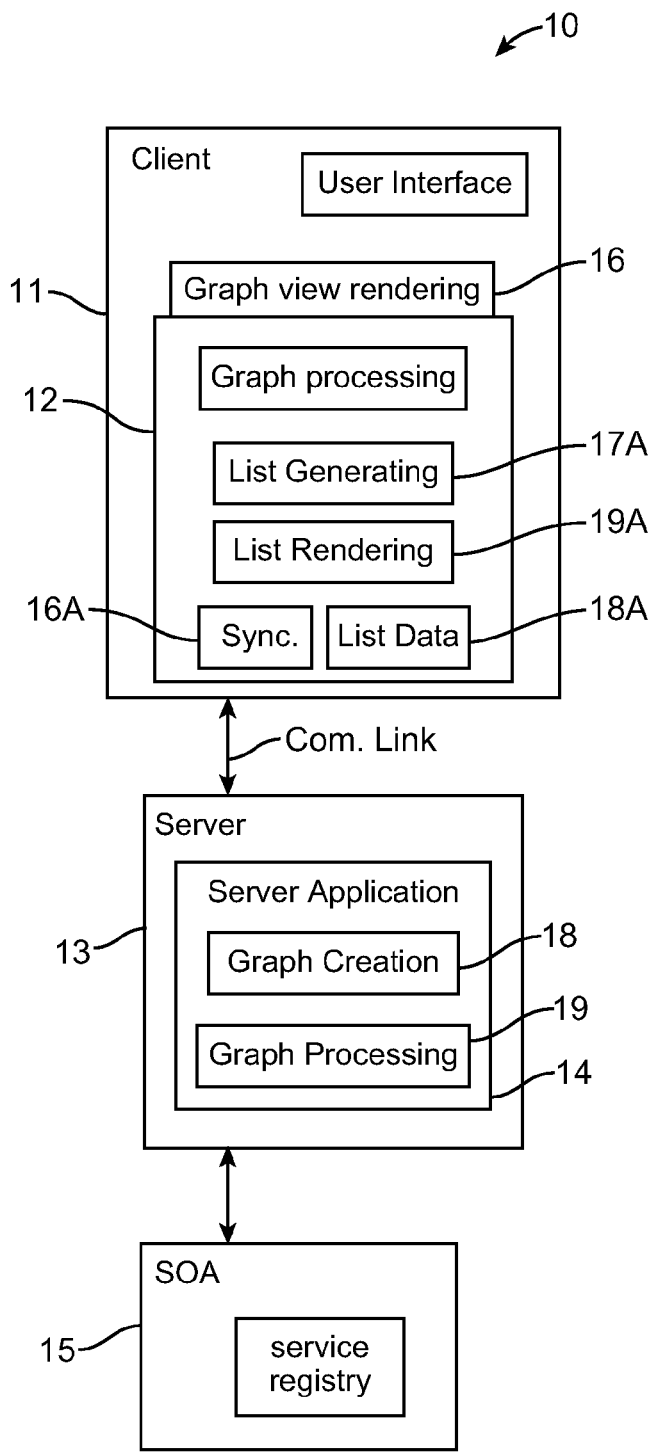
FIG. 1 shows a functional block diagram of a system for generating and displaying an interactive dynamic graph view and corresponding list view, of multiply connected objects, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for generating and displaying an interactive dynamic list view of multiply connected objects. One embodiment involves displaying object graph content in a linear, accessible manner in a web browser client. Contents of a graph view are represented and interacted with in a separate accessible control as a list view, with no loss of detail or function, while simultaneously displaying the original graph view of the same data. Understanding the contents and structure of a graph is simplified when all the elements and relationships between them are visible to the user. The user can quickly select any element and perform some action on it.

A list view of the objects is synchronized with the graph view. When a change occurs in the graph view, such as an object being removed or selected, the corresponding entry in the list view of the objects is also removed or selected. Conversely, if objects are selected, or removed in the list view, the change is reflected in the graph view. Having a list view, along with the ability to tab sequentially through the objects, enables users to more efficiently interact with the graph data.

An embodiment of the invention combines a graph view with the list view on the same display such that both sighted users and sight impaired users can interact with the display. There is no need to have a separate accessible view. The list view of the graph is useful to quickly identify and select objects of types of interest, simply by scrolling down the list, especially when the graph scale factor means that not all objects are showing on the screen at the same time. In one example, the list view is implemented on a standard web browser, without dependency on function of a server application for the list view.

A preferred embodiment of the invention in relation to registry applications is described below. A registry application manages sets of data that can be multiply inter-connected by any number of relationships, where each data object may represent some physical artifact or business unit. Users of such a registry are interested in understanding the inter-dependencies between the objects stored in the registry, such that they can quickly see the effect of changing any of the data objects on other data. It is also a convenient way of applying a common operation to multiple objects selected in the graph representation.

The invention provides a list view of the objects in the graph that is synchronized with the graph view. In the description below first an example of generating and presenting a graph view to the user is described. Then an example of generating a list view of the objects in the graph that is synchronized with the graph view.

Generating Graph View

An example rendering system generates and displays an interactive dynamic graph view of multiply connected objects. The rendering system implements a rendering process for generating a dynamic graph view for illustrating, and interacting with, multiply connected objects in a web browser client. The rendering process allows a user to interact with the graph to find more information about the objects displayed or perform further actions with one or more of the objects. The system allows display of a graphical view to an end user with commonly available web browsers without the need to install plug-ins.

The system uses the capabilities of browsers and software libraries to enable data generated by server applications to be visualized as vectors that can be scaled, transformed and interacted with using vector graphics, providing users with similar quality presentation as dedicated rich client applications combined with the network efficiencies of a thin client retrieving pre-processed data from a server application. In addition, the system provides a mini-portal view of the entire graph allowing the user to track location regardless of the current scale factor of the graph. The system also provides a history of previous graph views so the user can return to previous views easily, without requiring much storage on the client and none on the server (this addresses a common problem with asynchronous browser applications where the user presses the back button to go to a previous view and then finds they are no longer on the same page).

A graph of objects is stored and managed by an application running on a server machine (i.e., server application executing on a computing device or system). The objects may or may not be interconnected. The objects have properties that allow them to be differentiated. For example, they may have a property that indicates the type of the object, or a name property that provides a human readable label. Objects may be connected to one another by relationships. A relationship originates from a source object and connects to a target object. The relationship itself may have properties to track which source and target objects it spans, and also descriptive properties such as a relationship name.

In order to view the graph of objects in a user interface, a set of relative coordinates for shapes that represent each of the objects in the graph is computed by the server application, such that the visible graph represents the structure of the graph (i.e., the objects that make up the graph and the relationships between them). This calculation may also apply constraints to improve the "readability" of the drawn graph. The constraints that affect structural and aesthetic interpretation may include: connection lines that represent relationships, should not cross; connection lines should not cross shapes that represent objects; any hierarchy in the graph should be apparent, either by position or by indicating direction of relationship; connection lines should be short; connection lines should be aligned straight (e.g., horizontal or vertical); the distance between two objects should be as short as possible.

Once the graph layout (i.e., the set of graph coordinates assigned to objects and relationships) is determined, the graph can be drawn on a user interface by the server application. For an environment where a web browser provides the user interface, the server application must make this graph coordinate data available via a HTTP request. The graph may be transformed into a bitmap image (such as a JPG or GIF format file) and displayed on the web page. The image is static and provided limited interactivity. Each bitmap image consumes storage and network bandwidth, depending on the color depth and quality of the image. Specifically, the graph could be drawn as a bitmap image by the server but that is inefficient as it causes large network load, and is not interactive. It is therefore preferable to send only the coordinates to the client, wherein the client renders the graph such that users can interact with the individual elements of the graph.

Asynchronous JavaScript and XML (AJAX) describes a technology that is used to retrieve data to a client, such as a web browser for drawing graphs (no special client side code/plug-ins are required). AJAX describes a technology (i.e., a combination of technologies) where web browser clients make an asynchronous HTTP request to a server and when data is returned as Extensible Markup Language (XML) or JavaScript Object Notation (JSON), it activates an event in a JavaScript program executed within the browser. JavaScript code can be written to handle these events, and modify the current HTML page in place in some way that reflects only changes to the page rather than redrawing the entire web page.

According to an embodiment of the rendering system, history lists are used in conjunction with graph rendering and AJAX to allow previous graphs to be redrawn. Overview windows are applied to the graphs. One implementation is for accessing the data in a service registry and displaying the data in a web browser environment for a service-oriented architecture (SOA) computing environment. In a SOA environment, Service Registries contain documents that relate to services and the associated schemas, policies, etc.

One implementation using AJAX provides a lightweight system for graphic illustration of server content, in a system agnostic manner (client) while maintaining fluidic interaction. The system summarizes content as concise elements, until focus is attained and sustained on an element for illustrating full element content. The system preserves navigation context, so as to be able to return to previously visited areas of focus in a model. The system displays content of a greater volume by using a scrollable, visual overview window.

An AJAX implementation of a rendering system for drawing objects in a browser environment is described below. A graph settings data structure is utilized by the rendering system, which allows the client and server implementations to control the parameters which affect how the object graph is retrieved and presented. This includes filtering the types of objects to be shown in the graph, the types of relationships to show, the orientation of the graph (left to right or top to bottom), etc. FIG. 1 shows a functional block diagram of a rendering system 10, according to the invention. The system 10 includes a client 11 including a browser client 12, and a server 13 including a server application 14 which accesses data objects from a data source 15 (e.g., database such as a SOA service registry). At the request of the browser client 12, the server application 14 generates graphs from said objects in the data source 15, to be displayed by the browser client 12. The client 11 has a display and user input devices, and may be a computing module, a computing node, a computing device, etc. The server 13 may be, for example, a computing module, a computing node, a computing device, computing system, etc. The client 11 and the server 13 are connected via a communication link (e.g., network, Internet) for data communication. The server 13 may service multiple clients according to an embodiment of the invention.

Figure 2:
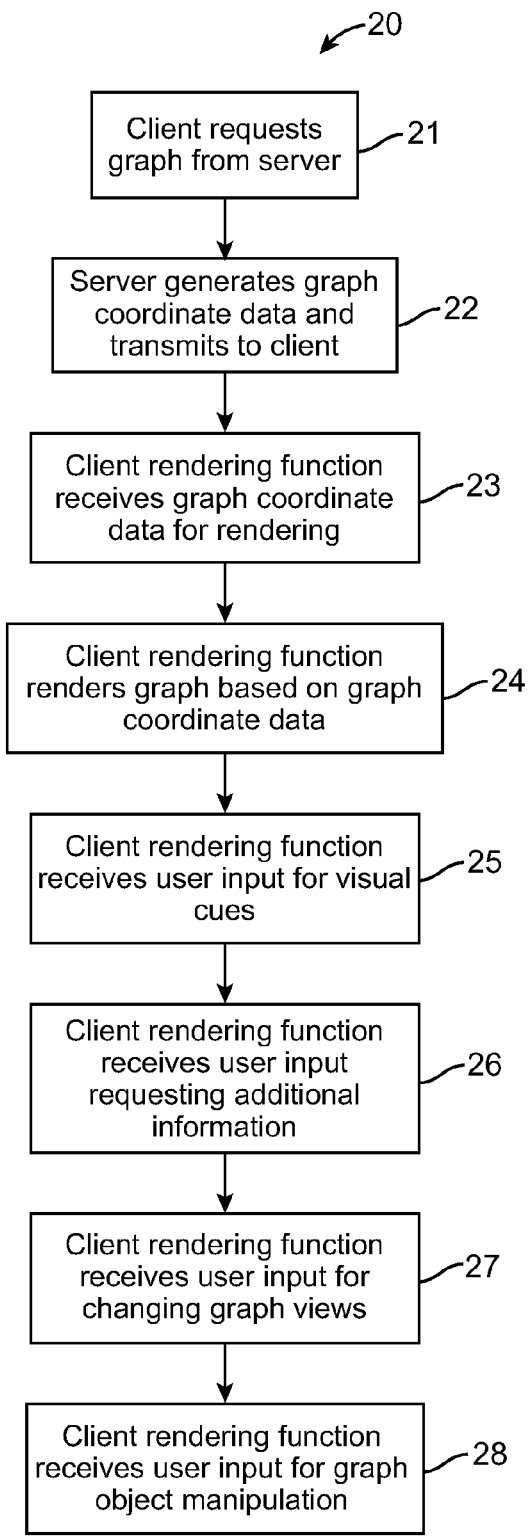
FIG. 2 shows a flowchart of a process for generating and displaying an interactive dynamic graph view of multiply connected objects, according to an embodiment of the invention.

Referring now also to FIG. 2, the rendering system 10 implements a process 20, according to an embodiment of the invention, including the process blocks described below.

Block 21: The client (e.g., browser client) requests a graph view from the server application.

Block 22: The server application accesses a data source for data to be presented as a graph, and computes graph coordinates and layout. The server application may comprise a distributed server application. The data source may comprise a database or a service registry in an SOA. The server application sends the graph coordinate data to the browser client in a lightweight, standard format.

Block 23: The browser client includes event handling code to process graph coordinate data into a form suitable for display. The browser client further includes rendering code for a graph drawing function library that allows vector graphics to be drawn to any browser that supports a vector drawing format, such as Scalable Vector Graphics (SVG) or Vector Markup Language (VML). The browser client code is not dependent on any specific implementation of vector drawing capabilities in the browser, either built-in or by installed plug-in The graph is rendered at the browser client using vector graphics Block 24: The browser client code processes the received graph coordinate data by drawing shapes (e.g., rectangles) where an object in the graph is to appear, connects those shapes together where a relationship exists and indicates direction with an arrow head. The browser client code then appends labels on objects and relationships where such properties have been provided by the server application. The graph coordinates are scaled to fit in the available graph drawing area, or to match the scale factor requested by a user.

Block 25: The browser client code then determines when the mouse cursor (e.g., moved by the user) is over any shape or connection in the graph and may provide additional visual cues (e.g., highlighting shapes and connections in a different color or style, or showing additional information about an object).

Block 26: The browser client code determines when the user "clicks" an object by moving the mouse cursor over the object and clicking the mouse button. This action results in a behavior determined by the application programmer (e.g., selection of the object or objects, ready for some other action to be chosen and applied, etc.).

Block 27: The browser client code allows the drawing canvas to be "dragged" around the visible drawing area such that the graph contents are moved correspondingly. The user moves the mouse cursor to an area where no objects have been drawn and holds down the mouse button while moving the mouse cursor. This has the effect of attaching the cursor to the drawing area and as the mouse is moved, the graph contents move correspondingly.

Block 28: The browser client code identifies (e.g., highlights) the object from which the graph drawing originates, the root object (e.g., by drawing its outline rectangle in a solid blue line). The browser client code allows selection for display of additional information. In one implementation, the browser client allows selection of objects by clicking within the shape being used to represent the object. Selection of an object is indicated by e.g., shading the object shape a different color. This indication allows the user to choose and apply an action to the currently selected objects. Further, the browser client code can provide additional information about any graph element (such as an object or a relationship) when the user hovers the mouse cursor over the element. This highlights the object under the cursor (e.g., with a yellow dotted outline) and displays a pop-up window or tooltip containing the additional information.

The above process is now described in further detail in terms of the operations of the server and the client.

When the server application receives a request from the client to generate graph coordinates and other information for a graph of a given depth starting from a specified origin (root) object having an identification ID, a graph creation function 18 (FIG. 1) of the server application discovers and maintains relationships for display as a graph.

Starting with the root object ID, the object is retrieved from the data source 15 by the graph creation function 18. The graph creation function 18 then creates a graph node with properties that are required for display (e.g., object name, type, unique ID). The graph node is added to a map of node IDs. The graph node is set as the source node (source object).

Next, the graph creation function 18 recursively traverses relationships from that object to find the next level of target objects to add to the graph, according to the settings for the graph passed from the client. The settings determine the depth of objects to be fetched and the types of relationship to be followed. Next, when a relationship is traversed, the graph creation function 18 retrieves the target objects, wherein if the object ID for a target object does not exist in the node map, a graph node is created with properties required for display of the target object (as for the source node), plus a unique ID. If the graph node does already exist, it is retrieved from the node map.

The graph creation function 18 then adds the graph nodes to an edge object. An edge object represents one or more relationships between the source object and the target object. Importantly, an edge can represent more than one relationship. It does so via a relationship vector object for each type of relationship connecting the source object and target object.

After an edge is created between source and target graph nodes, the graph creation function 18 sets the target nodes as source nodes in turn and their relationships traverse until the depth limit set by the graph settings object is reached. At this point, there is a set of graph node objects and a set of graph edges. This collection of data is then provided to a graph processing function 19 (FIG. 1) of the server application to transform the collection data into a set of graph objects with coordinates such that the graph meets readability constraints (i.e., the graph contents are arranged such that the connection crossings are minimized and connection lengths are reduced to reduce graph density and complexity). If relationships exist that may cause a cycle in the graph, these relationships are reversed and marked as such. This allows the entire graph to have all relationships in the forward direction (i.e., the graph flows away from the root object). This helps the layout engine arrange the objects in the graph in a hierarchical manner.

The graph processing function 19 then transforms the graph data objects into lightweight objects that can be transferred to the client 12 efficiently across the communication link. In one example, the "lightweight objects" comprise the minimal representations of objects required by a client application to render a graph and are optimized and arranged such that the client can process them quickly. When the server application processes related objects to build up the graph structure, there are several properties on those objects that are only relevant in the server application context (sending these to the client consumes valuable network and memory resources). The server application typically runs on a dedicated, high performance machine and preparing the data for transmission to the client relieves the client of having to do any object unpacking and transformation, and has little effect on the performance of the server application. The role of the client application is to render the graph coordinates and respond to user input. The object graph classes are designed to avoid any duplication of data, to keep identifier strings small, and also provide mappings between related objects to assist processing of the data at the client 12. Object attributes are described only once. An edge list references the objects by ID. All object types are reduced to a unique object type ID. All relationships are reduced to a unique relationship ID. Cyclical references are avoided using data structures that deliberately separate the list of object nodes and the list of relationships between those nodes. A separate data structure provides access to the natural language support (NLS) translated text (in the client) for the names of each of the types of object and the names of each of the relationships.

The object graph is serialized (e.g., in JavaScript Object Notation (JSON) format) and sent to the client 12 from the server application 14. In one example, using JSON reduces the amount of data sent from the server to client compared with XML, and clients using JavaScript not need parse the data from XML elements (they are transformed into JavaScript objects on arrival at the client by the browser).

At the client 12, the client code comprising a graph processing function 17 receives the received object graph data. A rendering function 16 of the client code then scales the coordinates of objects to match the display area, renders visual elements such as shapes/icons, to represent graph objects, and adds text properties. Relationships between objects are drawn as connecting lines (edges) between the shapes. When processing relationships, the rendering function inspects the relationship vectors and if they are marked as reversed, it switches the direction and draws an arrowhead in the correct direction.

The rendering function inspects each edge object and the relationship vectors associated with them. If there is more than one relationship vector in the same direction, the rendering function draws a double arrowhead, or a single arrow if there is a single relationship vector. If the relationship vector is marked as reversed, the connection line can have an arrowhead pointing in the other direction, or a separate connection drawn with a reverse pointing arrowhead.

To set up mouse event handling code when a user moves a mouse cursor over a relationship connection line, the client stores a reference ID in an attribute on the HTML element used to represent the connection line. When a mouse-over event occurs, the client can retrieve the edge data that the connection represents in order to build the list of information to display in the pop-up window or tooltip. For each relationship vector in the edge object, the client code can use the relationship ID to look up a text label for that relationship (e.g., in the locale suitable for a client web browser).

An example operation scenario of the rendering system 10 according to the above process 20 is described below.

Requesting a Graph for a Starting Object

The server application 14 provides the browser client 12 with a list of data objects from the data source 15. This list can be a predefined list of objects of the same type or the result of a search of objects that match some criteria. The user selects an object from the list, requesting a graph to be drawn. Specifically, the user selects an object (i.e., root object) from the list of available objects, requesting that a graph be drawn for the selected object. FIG. 3 shows an example of a user interface for list 30 of objects 31 from a service registry, wherein the user may request generating a graph for the object by selecting a graph icon 31*i* (e.g., WSDL document object) from the list 30. The user interface is displayed by the browser client. The user may be viewing a detail view of an object 31 selected from the list 30, and then requests drawing a graph for it. FIG. 4 shows an example detail view 40 for a selected WSDL document object 31 displayed by the browser client 12, wherein a user is clicking a Graphical View link 32 therein to request a graph generation process for the object 31.

When the browser client 12 request drawing a graph based on the current object, an asynchronous HTTP request is made from the browser client 12 to the web server application 14 via the communication link. The server application 14 begins processing the graph, and in the meantime the browser client 12 may, for example, display an animated icon to indicate the request is being processed.

Figure 5A:
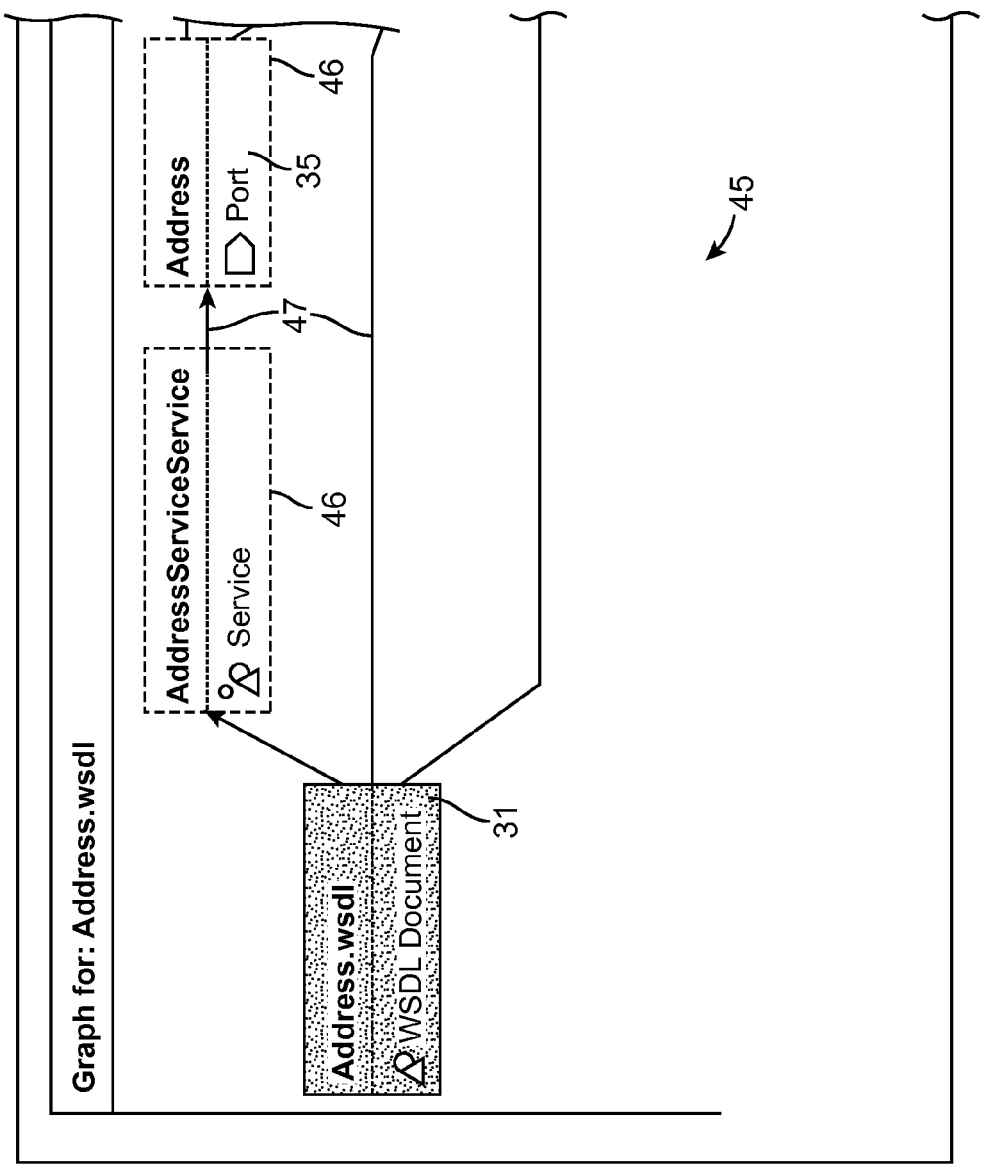
Figure 5B:
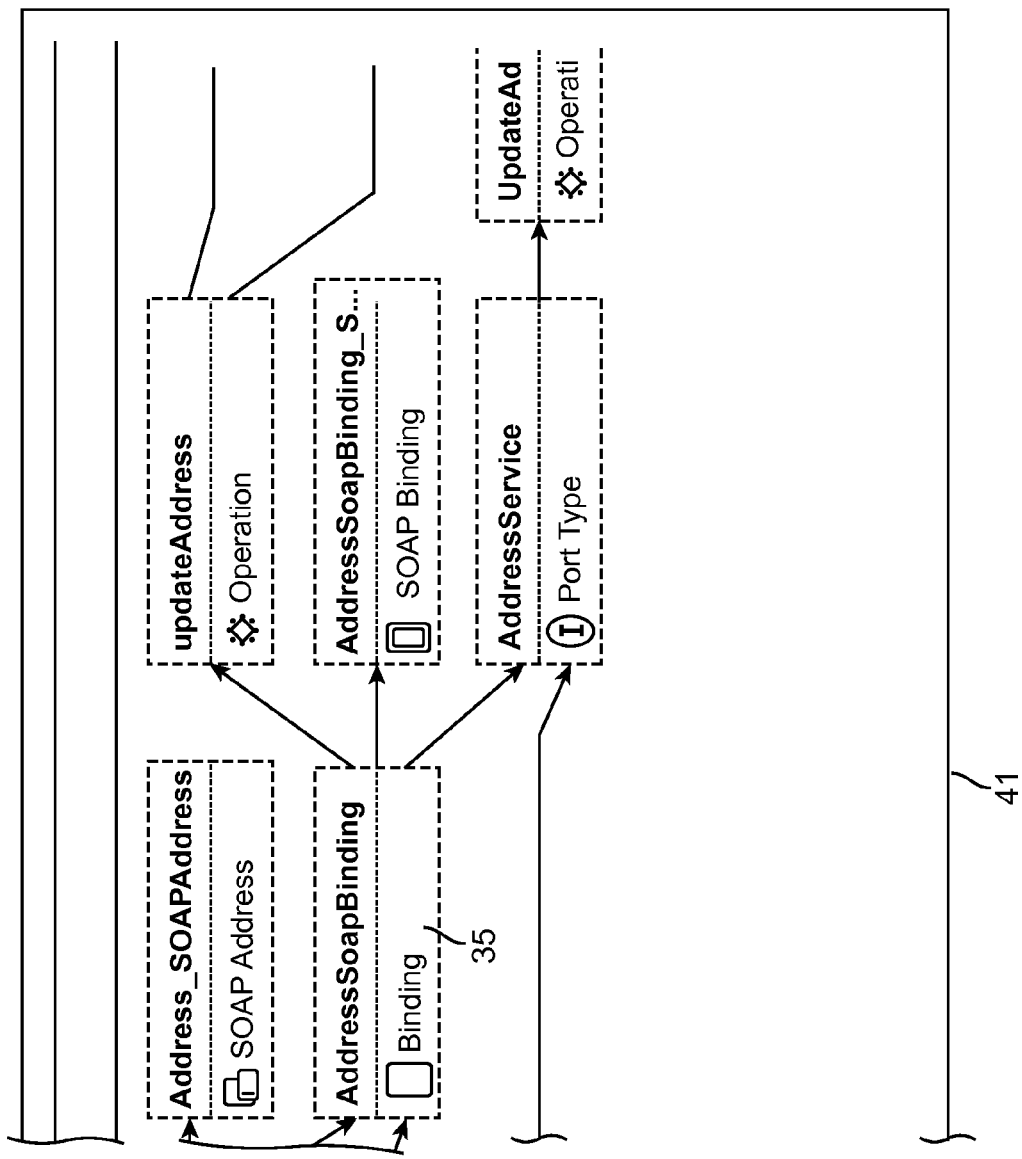

When the server application 14 completes generating the graph, it sends the graph data to the browser client 12 as XML or some other text format, and the rendering function 16 (FIG. 1) of the browser client 12 is notified accordingly. The rendering function 16 then parses the received graph data and renders a graph of the root object 31, wherein the graph includes graph elements (shapes) and connections. FIGS. 5A-B shows an example graph 45 in a window display 41 of the browser client, including shapes 46 that represent objects 35 and lines/arrows 47 that represent connections (relationships). In the following, example operational features of the rendering function 16 are described.

Object and Relationship Highlighting and Information Views

In the graph 45, by default, the root object 31 (e.g., Address.wsdl WSDL Document) is highlighted (e.g., in a different color) relative to other data objects 35 corresponding to the root object 31. In the example graph 45 (FIG. 5), all objects 31, 35, are shown as rectangles, with a text label showing the object name value. Differences between object types are indicated by a graphical icon and a text label displaying the object type. Objects are further differentiated by whether they are physical documents (e.g., as a rectangle with a solid outline, such as object 31) or objects derived from the contents of those documents (e.g., as rectangles with dotted outlines, such as objects 35). Relationships between objects 31, 35, are shown as lines 47 with arrowheads indicating the direction of the relationship.

Figure 6:
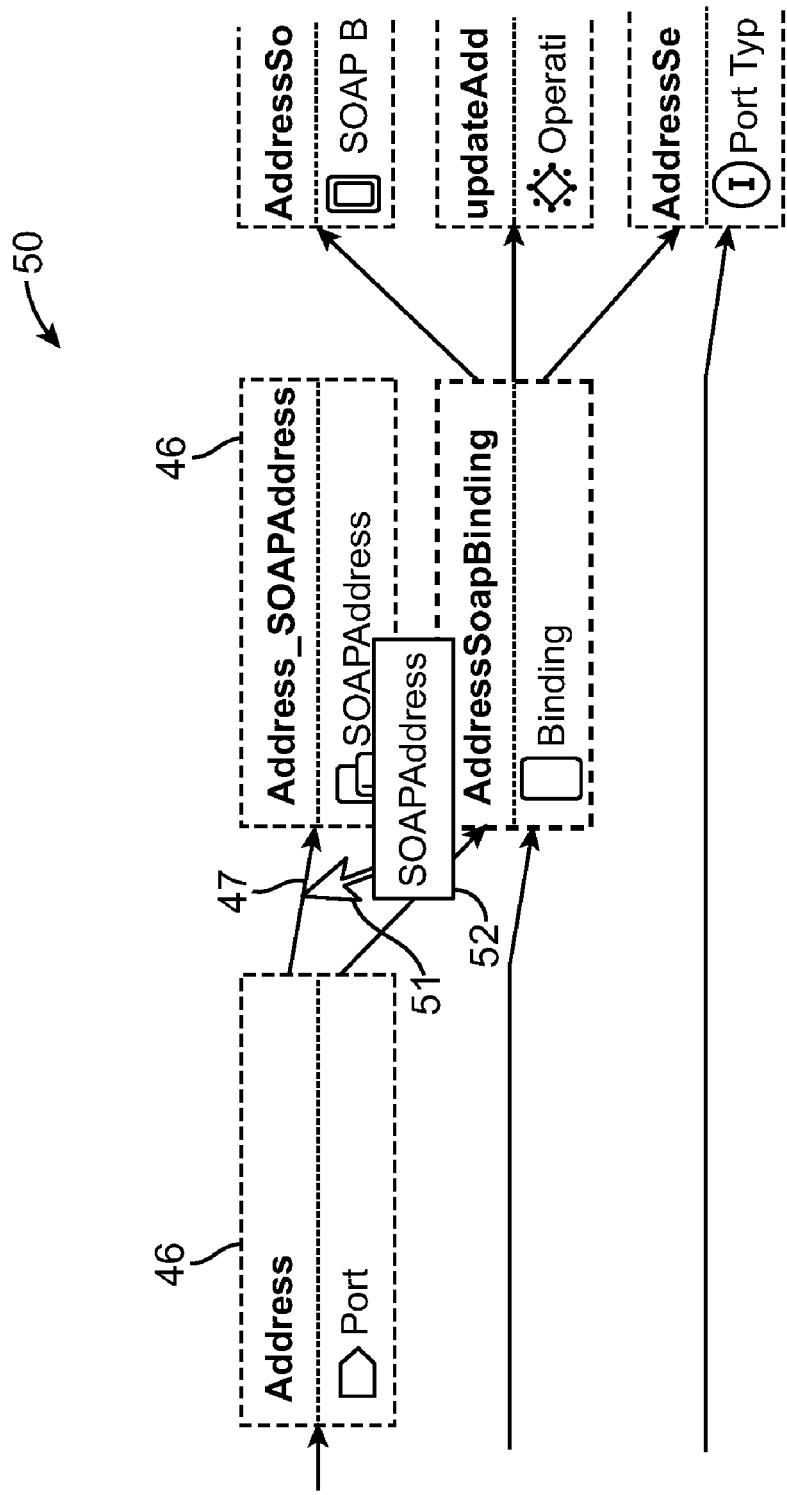
Figure 7:
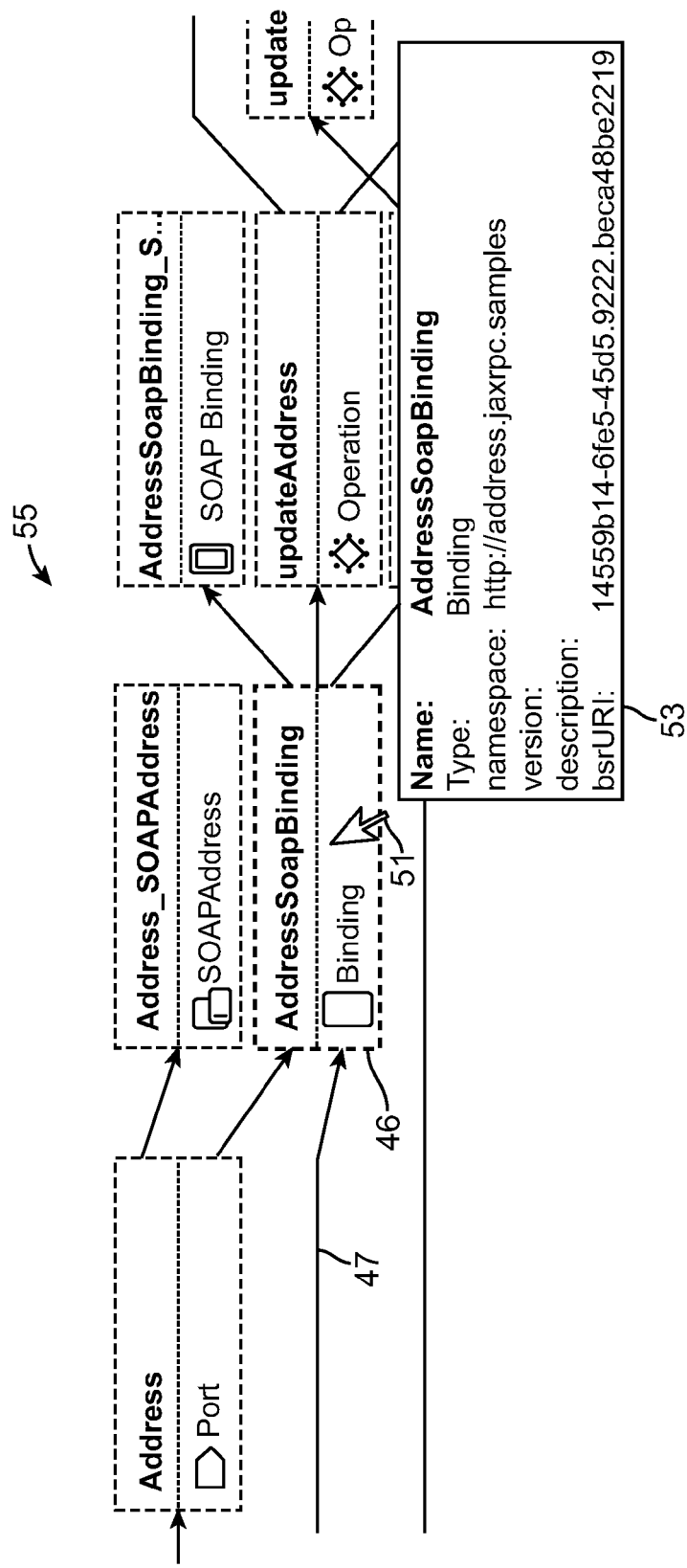

Referring to FIG. 6, an example view 50 of the graph 45 is shown. Hovering the mouse cursor 51 over a connection 47 highlights that connection (e.g., in a different color or style) and displays a pop-up window (or tooltip) 52 that includes the name (e.g., SOAPAddress) for the relationship(s). This saves the graph view from being cluttered with unnecessary labels. Highlighting the connection helps the user identify which relationship the window 52 is referring to, which is especially useful when the graph is complex with many, possibly intersecting connections 47. Referring to FIG. 7, an example view 55 of the graph 45 is shown. Hovering the mouse cursor 51 over a shape 46 representing an object, highlights the shape 46 (e.g., in a different color and/or style) and displays a pop-up window (or tooltip) 53 providing further details about the object. This saves the graph view from being cluttered with unnecessary information and labels.

Object Selection and Applying Actions

Figure 8A:
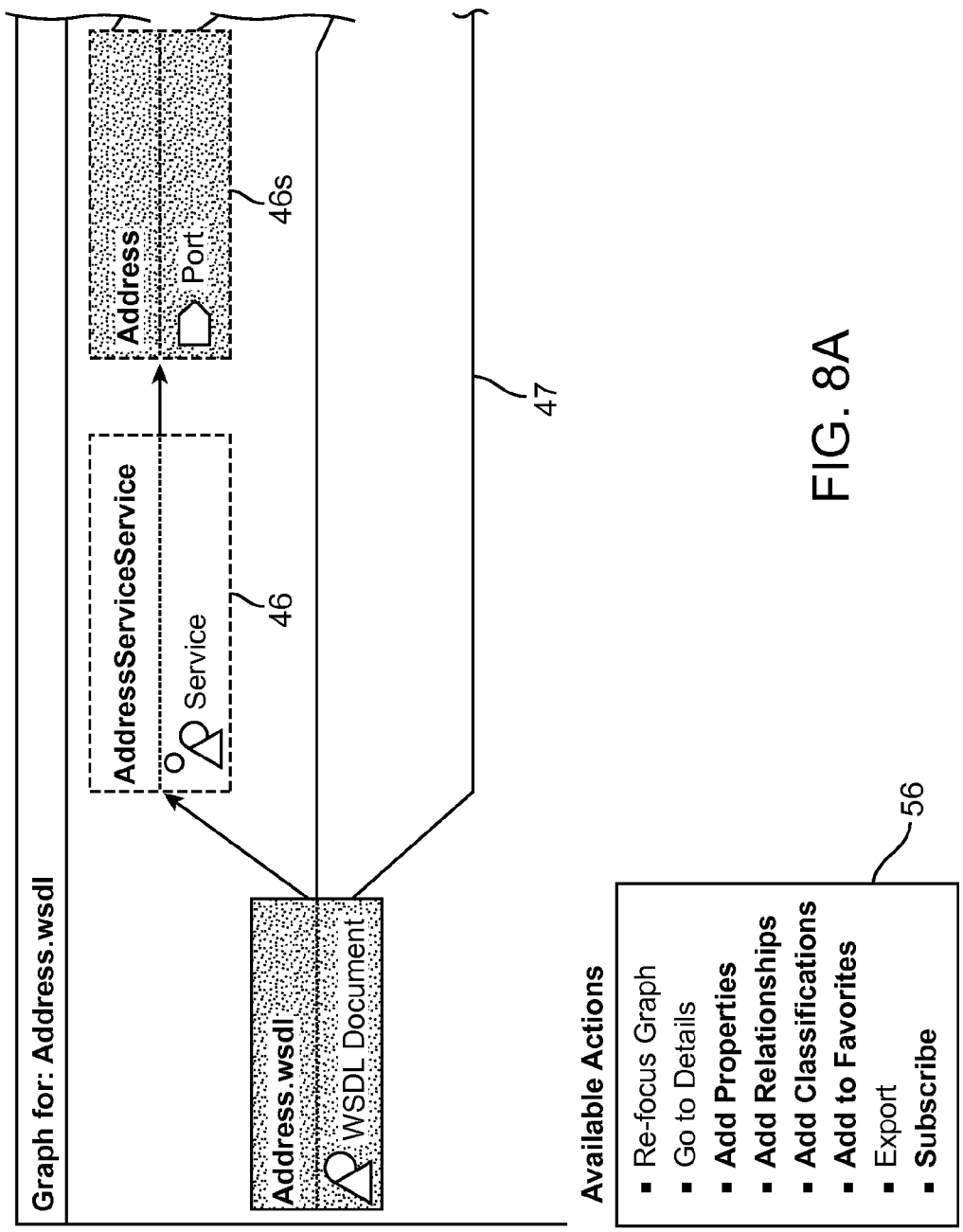
Figure 8B:
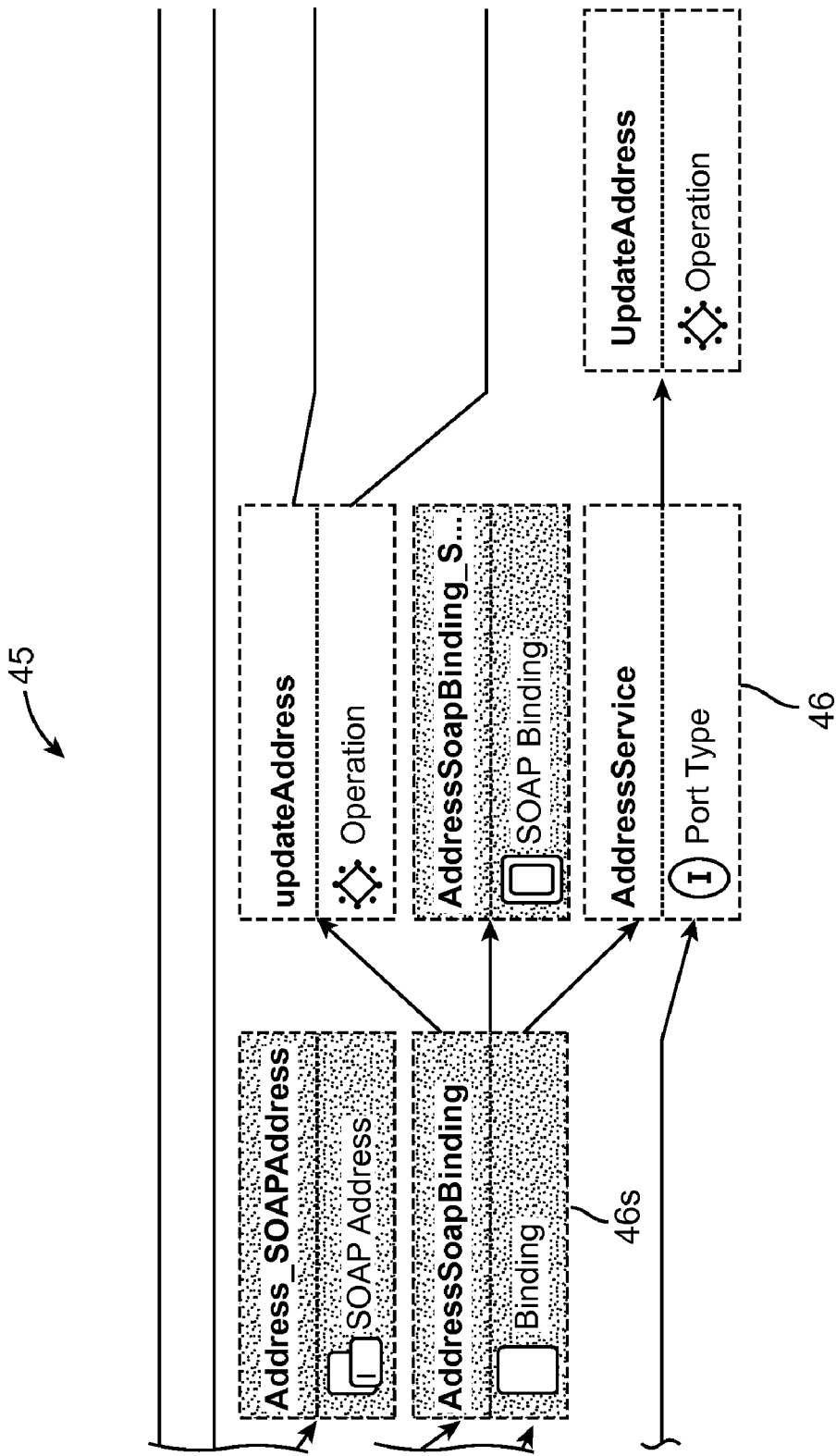

Objects in the graph 45 can be selected by clicking on their representative shapes 46. As shown by example in FIGS. 8A-B, one or more selected objects are shows by highlighted shapes 46*s*. To select more than one graph object, a control key can be held down as the user clicks on each of the objects they wish to add to the selection. With multiple objects selected, actions can be performed on all of the selected objects simultaneously by choosing the action from e.g. a pop-up list 56. In one example, certain actions may not be applicable when multiple objects in the graph are selected or when certain types of object are selected (e.g., inapplicable actions are disabled and grayed out in the list 56).

Navigation Context with Scrollbars, Canvas Dragging and Viewport

Figure 9A:
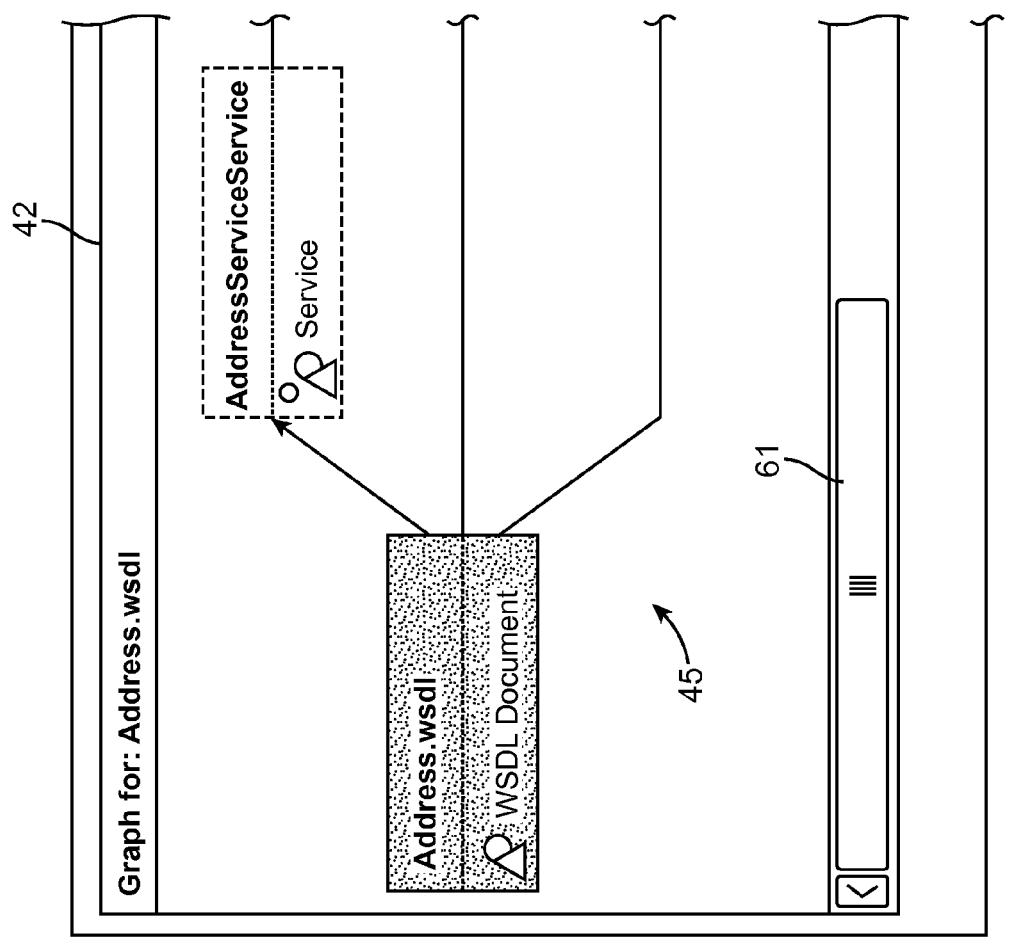
Figure 9B:
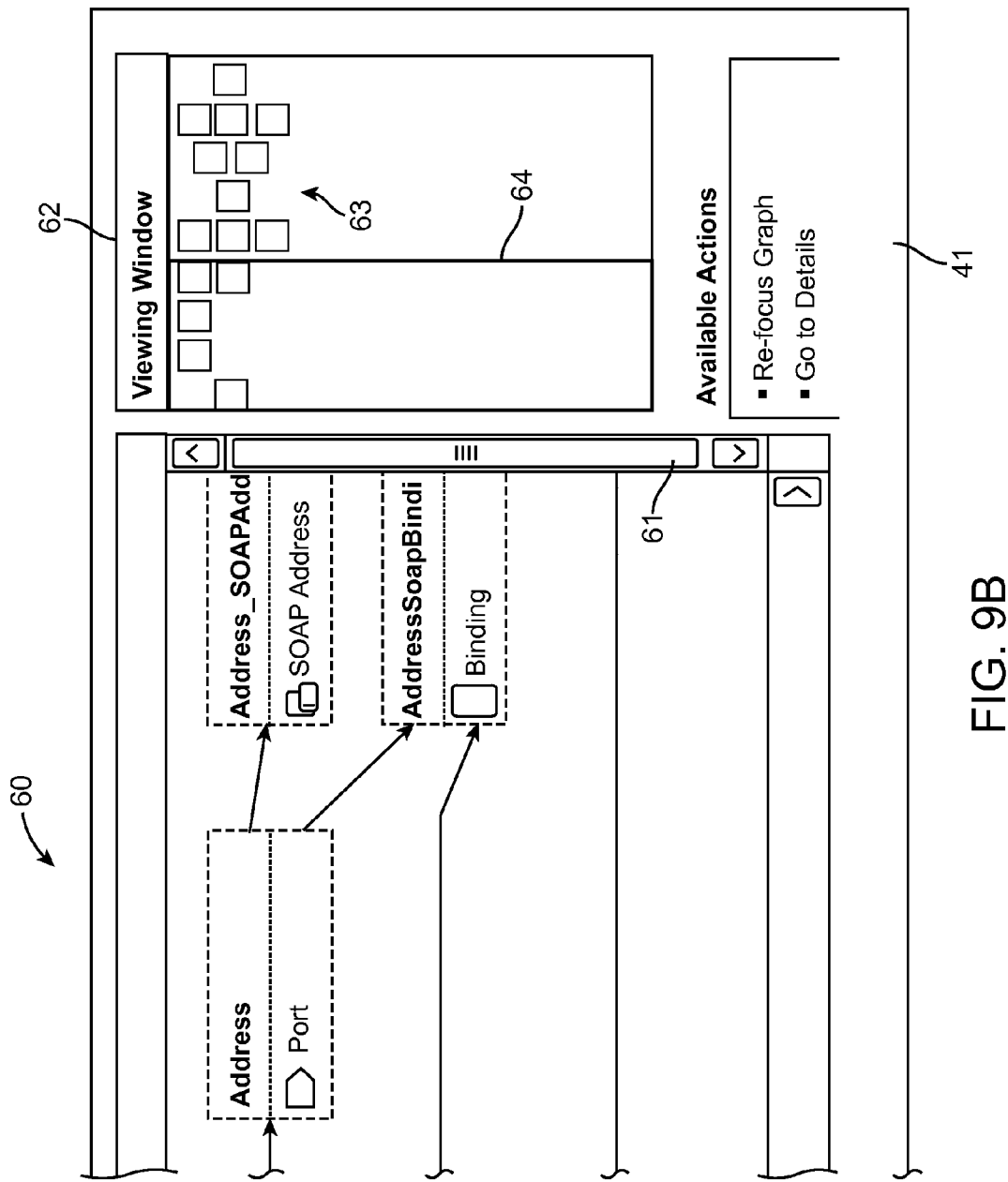

As shown by example view 60 in FIGS. 9A-B, if the extent of the graph 45 is beyond the area of a main graphical view window 41 of the browser client, then one or more scrollbars 61 are displayed. The user can move to other, hidden, areas of the graph by moving the scrollbars in the appropriate direction. In addition to using scroll bars to move around the extent of the graph, the rendering function provides the ability to drag the background drawing canvas. That is, the user can place the mouse cursor on an empty area of the display, press a mouse button and drag the graph 45 around to the desired position within a graphical view window 42. The user can control movement in the horizontal and vertical directions simultaneously. When the user is dragging the canvas, the mouse cursor changes to indicate the dragging mode. In the example shown in FIG. 9, the canvas has been dragged to the right.

Figure 10A:
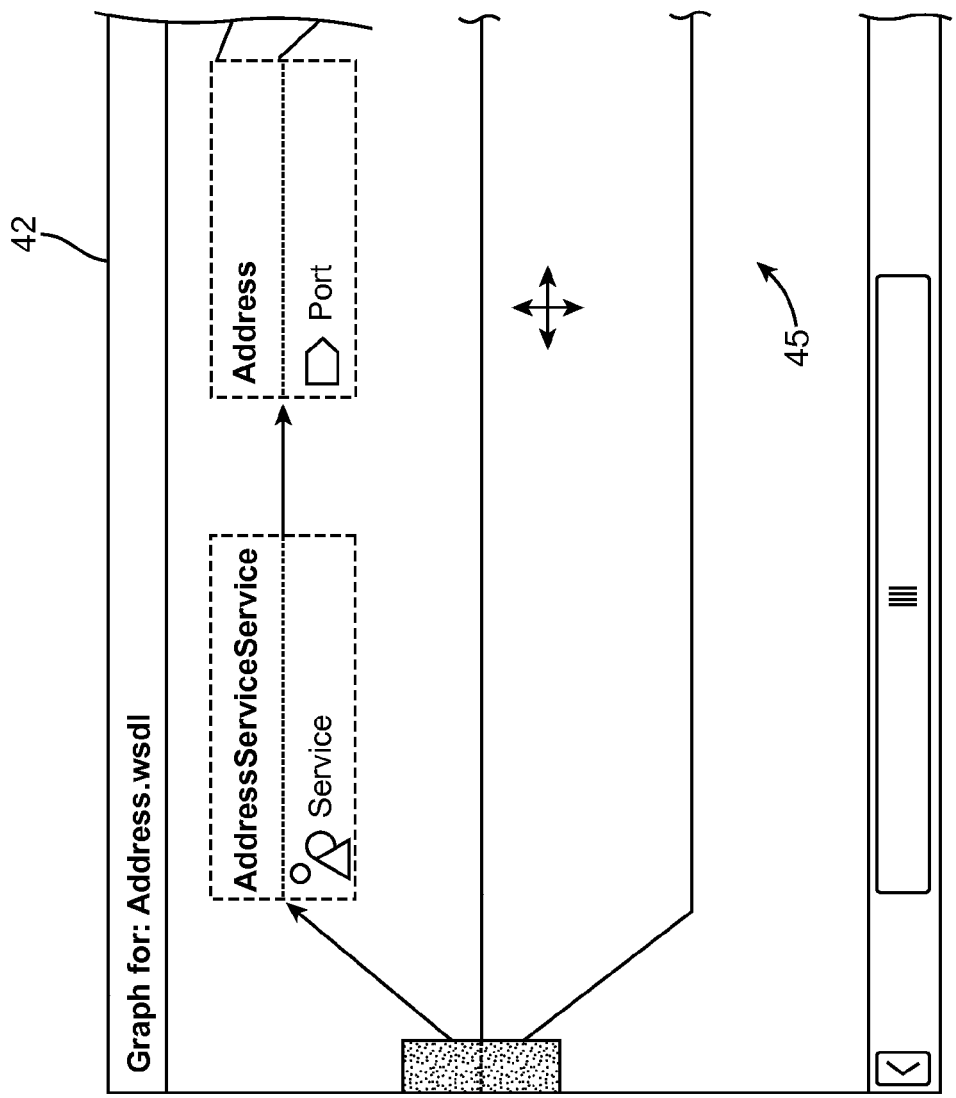
Figure 10B:
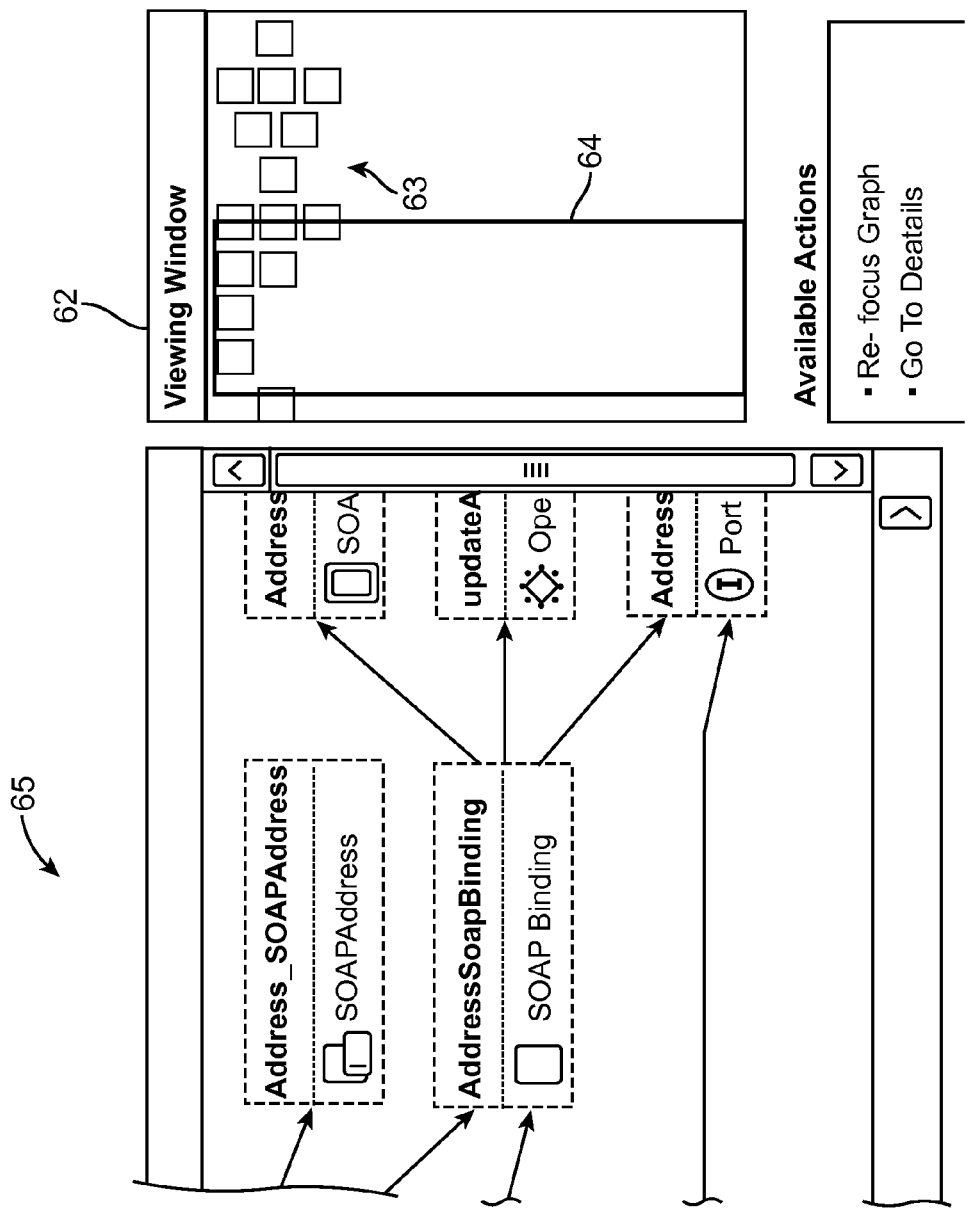

In the preferred embodiment, the rendering function implements a viewing window 62 onto the graph, to help users navigate around the graph, particularly when the graph does not fit the available display area. The example viewing window 62 represents a compact, simplified view of the entire graph structure 63, without text labels or connections. A view port window 64 (e.g., semi-transparent rectangle) within the viewing window 62 may be controlled by the user and can be dragged around in the viewing window 62 over the compact representation of the graph. Whatever underlying objects in the viewing window 62 are within the boundary of the view port 64, are displayed in the graphical view window 42 in more detail (the viewing window 62 is synchronized to the graphical view window 42). Referring to the example view 65 in FIGS. 10A-B, as the view port 64 is moved, the displayed portion of the graph 45 in the graphical view window 42 changes correspondingly.

Figure 11A:
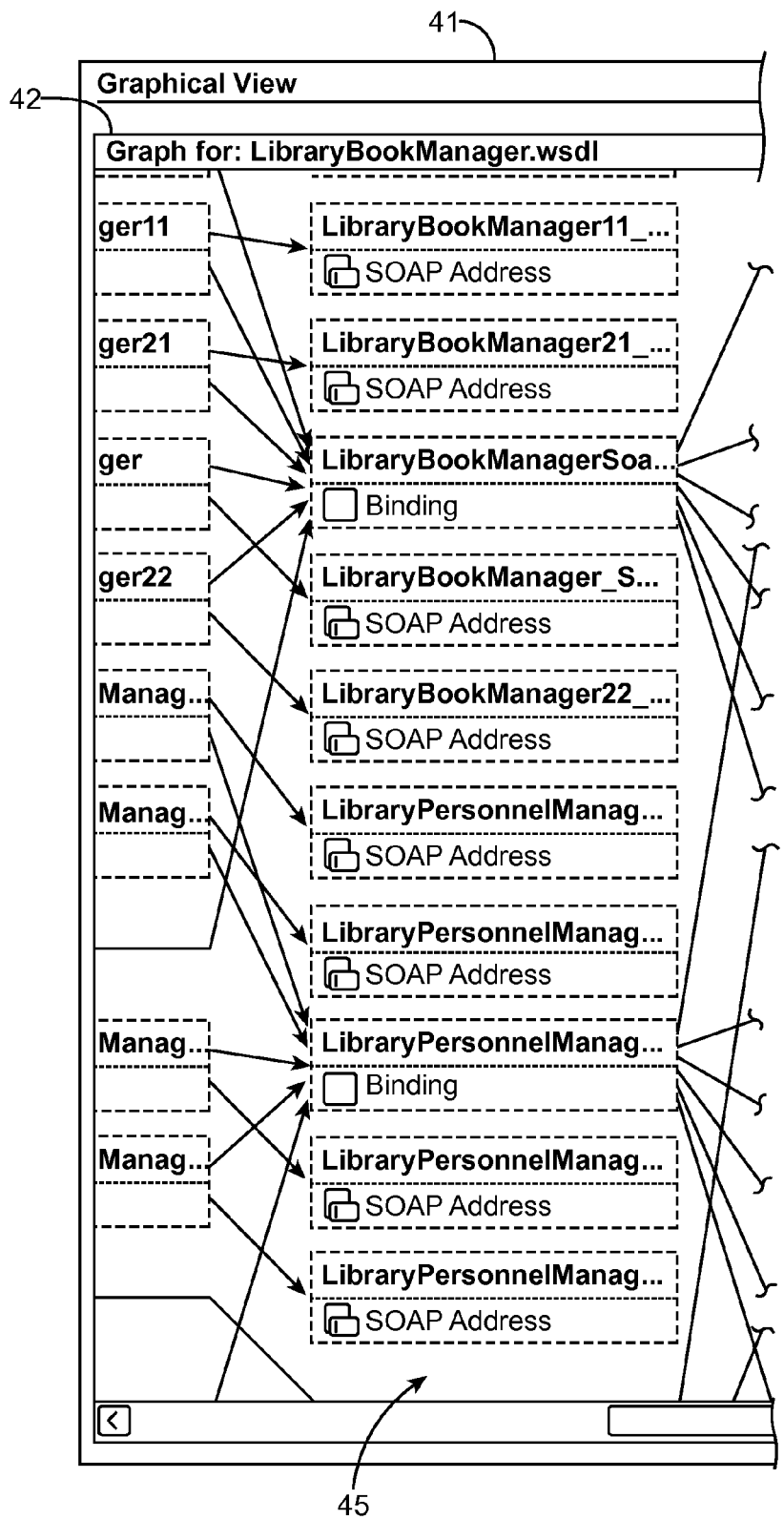
Figure 11B:
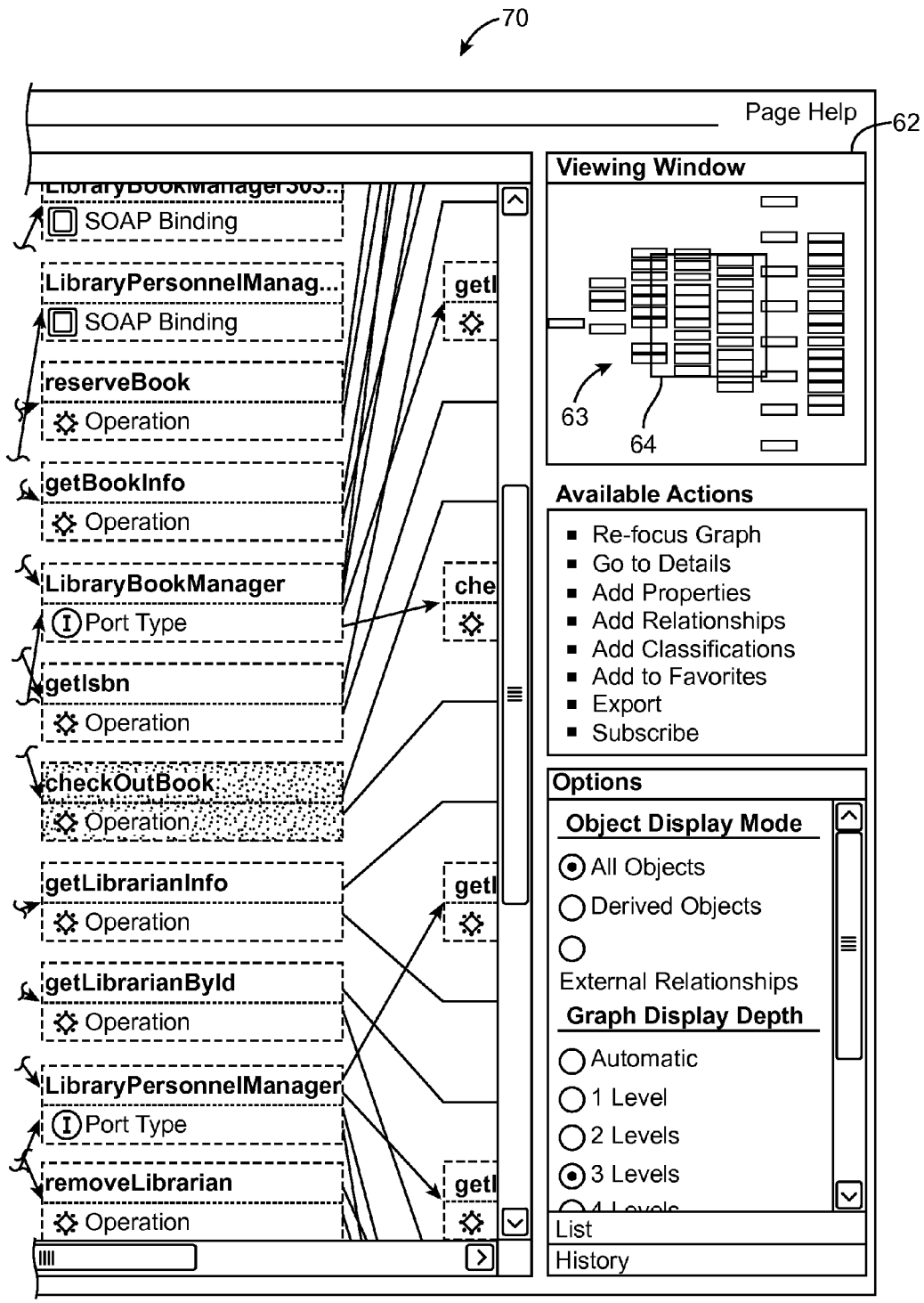

In this example, the proportions of the view port rectangle 64 match the relative proportions of the graphical view window 42. If the graphical view window 42 is wider than it is in the vertical dimension, this is reflected in the view port rectangle 64 of the viewing window 62. The size of the viewing window 62 is fixed and represents the contents of the entire contents (objects) graph structure 63. If the graphical view window 42 is sufficiently large to display all objects in the graph structure 63, the view port control 64 extends to the same size as the viewing window 62. Similarly, user movement of the scroll bars 61 on the graphical view window 62 will change the visible graph contents and this is reflected in the viewing window 62, with the view port rectangle 64 automatically moved accordingly. Dragging the background canvas of the main graphical view has the same effect. FIGS. 11A-B shows an example view 70, wherein as the view port 64 is moved, the displayed portion of the graph 45 in the graphical view window 42 changes correspondingly.

Keeping History of Previous Graph Views in a Browser Environment

In a browser environment, users are familiar with clicking the Back button to return to the previous page of data which was generated as the result of making a HTTP request to a server, and the entire page is fetched and displayed. For web pages using AJAX style technology, typically only those elements of the page that need refreshing are requested from the server asynchronously, and the relevant parts of the screen updated, without redrawing the entire page. The browser address does not change.

In the context of an embodiment of the invention, the user reaches a page which contains the object graph as well as related control elements, such as the viewing window 62, action list 56, and certain filter controls such as a view port 64. After viewing a graph 45, the user may decide to view another graph by starting at another object visible in the graph 45. The user can do so by choosing a Re-focus Graph action in the list of available actions 56, causing an asynchronous request at the server application, which in turn returns updated graph data.

The rendering function of the browser client then uses the updated graph data to render only the content of the graphical view window 42 (all other controls remain on the screen and are not refreshed). As such, less graph data need be sent from the server application to the client over the communication link, and reducing user wait time for screen updates.

Figure 12:
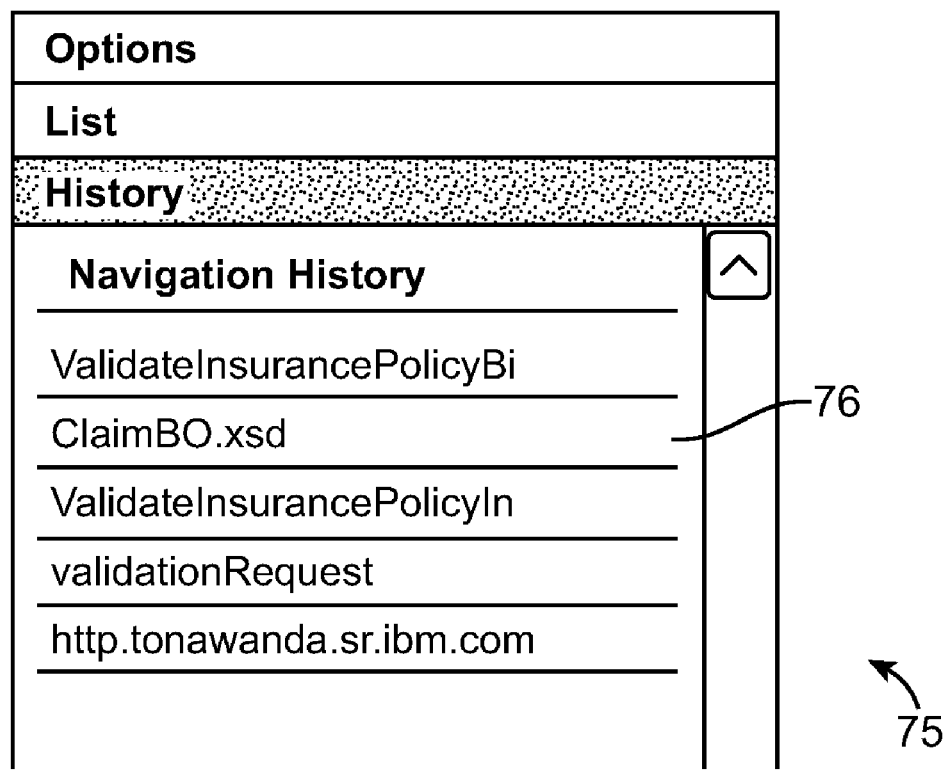

The rendering function maintains a graph navigation history which records the origin object for previous graphs, and their various display settings. FIG. 12 shows an example navigation history 75. The display settings may include, e.g., graph depth and filter settings. At any point, the user can now select a link 76 in the graph navigation history 75 to have the graph redrawn by the rendering function from that origin using the original settings.

Generating List View

The browser client code further includes a list generating function 17A (FIG. 1) such that, either before, after or while the graph element coordinates are being calculated for the main graph view area, the list generating function 17A also adds information about each object to a list 18A (e.g., list data structure). In the list 18A, each object in the graph view is assigned a property (e.g., identifier) that allows that object to be uniquely identified within the graph. The list 18A is used to generate a list view on the display. The identifier is used in the list view (or list control) to track when an object in that list is selected.

The list view can be shown in the same page as the main graphical view, or brought into the same view when the user needs it, by activating it or making it visible. The benefit is that the list view can be shown in the same context as the main graphical view such that a sighted and an unsighted user may share and discuss the same view without having to switch to a dedicated page. This also means that a user interface developer need not manage changing contexts to cater to the needs of different users.

Figure 13:
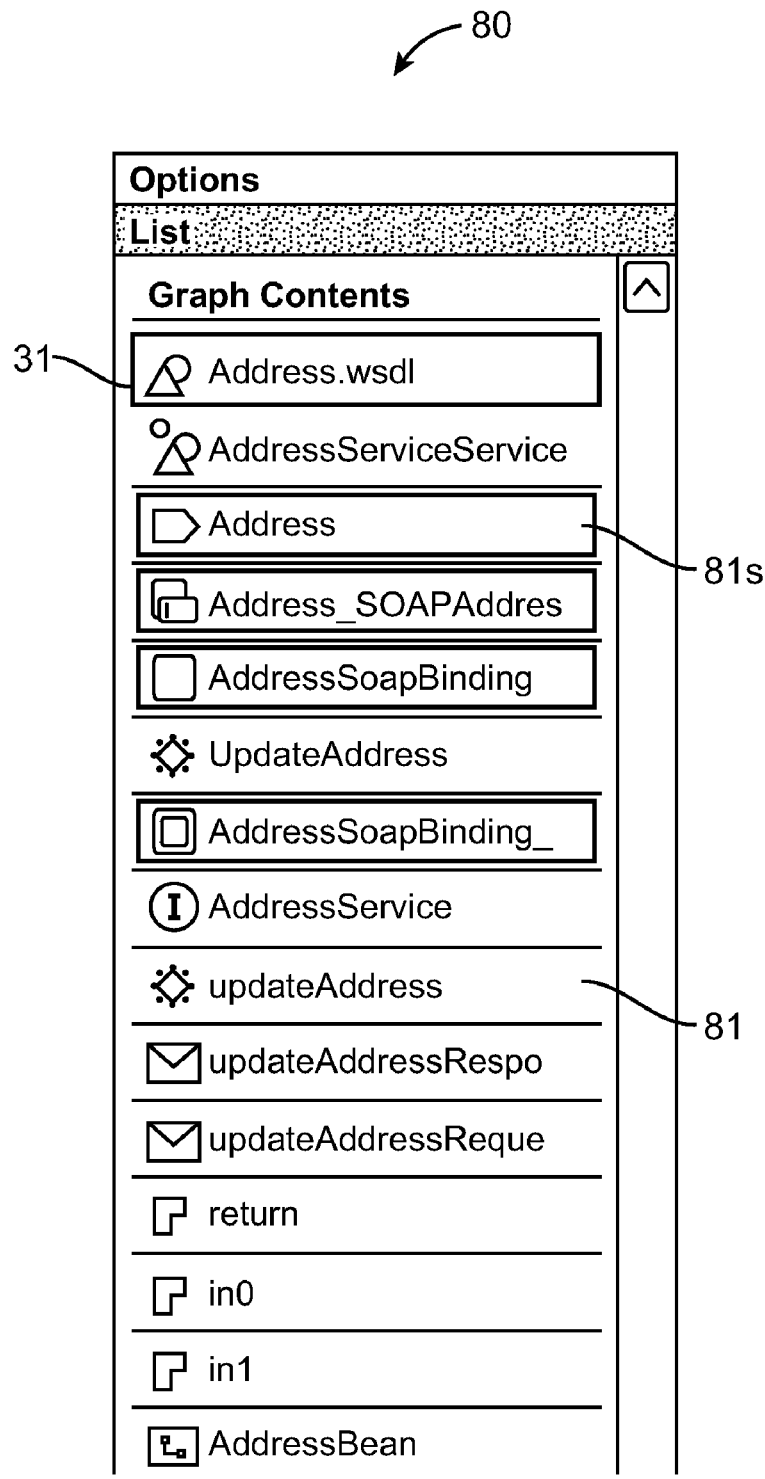
FIGS. 13-16C show examples of generating and interacting with a list view, according to embodiments of the invention.

In one example, if a single object or multiple objects are selected in the main graph view (e.g., graph view 45 in FIG. 8), then in a list view 80 of graph object contents (FIG. 13) including entries 81 corresponding to the objects represented by shapes 46 of graph, the list entries 81s corresponding to the selected objects represented by shapes 46s are automatically selected and highlighted in the same way (e.g., selected objects are shown as shaded rectangles in the list view 80).

Figure 14:
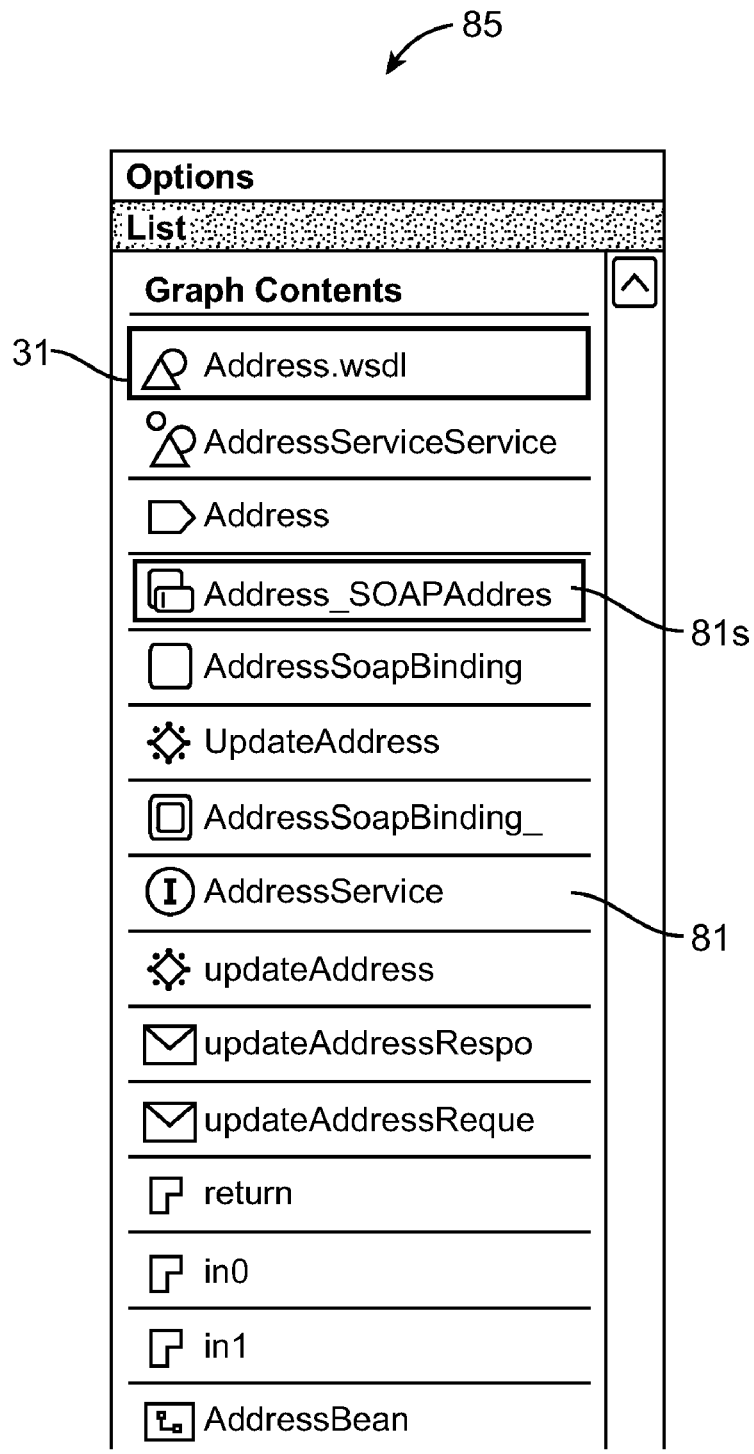
Figure 15:
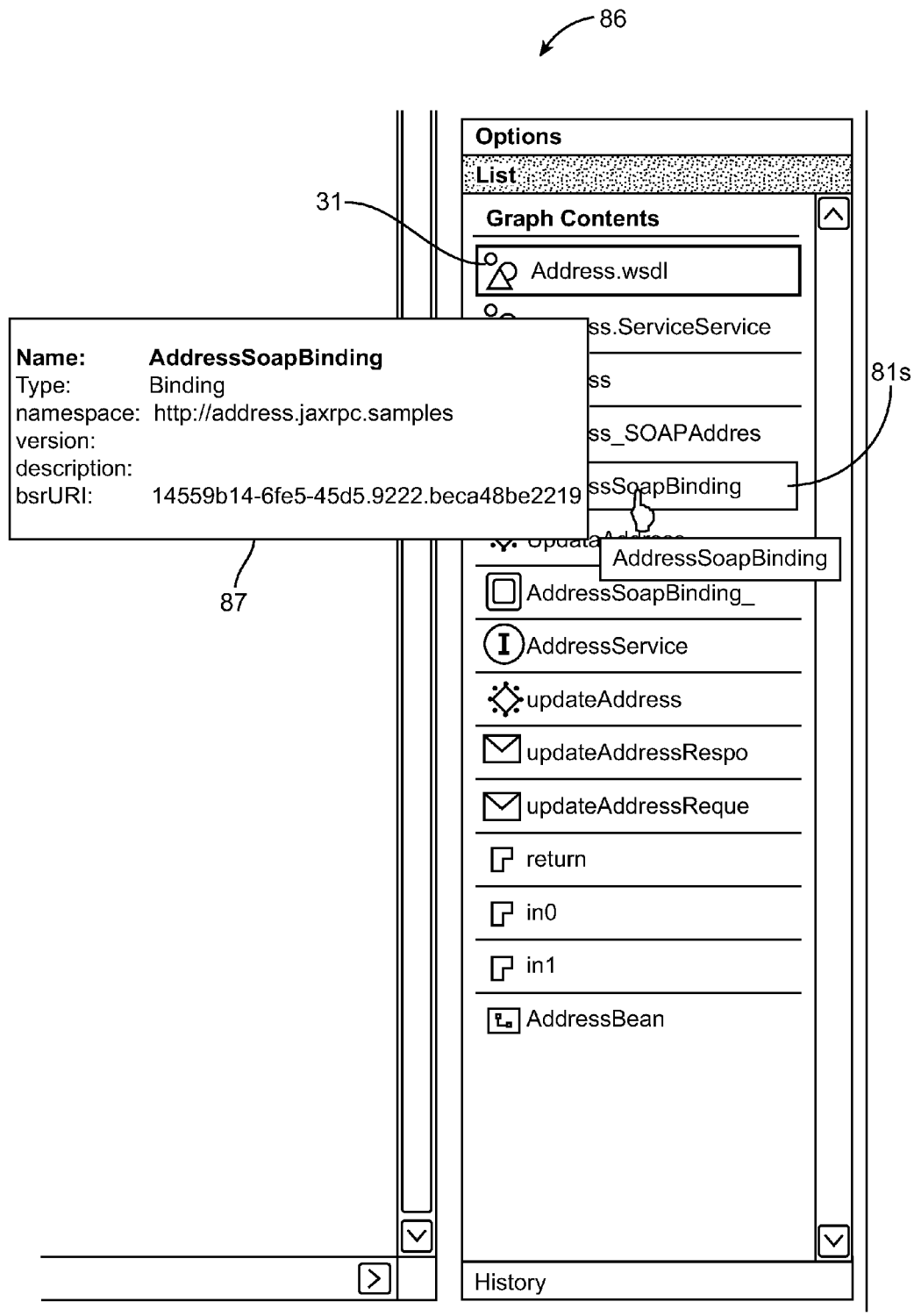

As shown by another example, list view 85 of graph object contents in FIG. 14, the root object 31 (e.g., Address.wsdl WSDL Document), is specially indicated at all times (e.g., by being drawn with a solid rectangle), regardless of whether it is selected. When a change occurs in the graph view (e.g., graph view 45 in FIG. 8), such as an object being removed or selected, the corresponding entry in the list view of the objects (e.g., list view 80 in FIG. 13) is also removed or selected. Conversely, if objects are selected, or removed in the list view, the change is also reflected in the graph view. Referring to the example list view 86 in FIG. 15, the list view also supports showing a pop-up window (or tooltip) 87 to provide additional details about the object the mouse cursor is currently over. This may include a list of relationships for which this object is the source. In one implementation, the list view is generated utilizing HTML elements, and controlled with JavaScript, by a list rendering function 19A (FIG. 1) of the browser client 12. The list rendering function 19A is configured for dynamically rendering an interactive dynamic list view of the multiply connected objects on a user interface at the client based on the lightweight object data, and receiving user input for dynamically interacting with the list view. A synchronization function 16A (FIG. 1) at the browser client synchronizes the graph view and list view as described herein.

In one example, the list generating function 17A performs the following steps. When the user requests to draw or redraw a graph view, the browser client makes a request to the server application to generate a graph structure and its constituent elements, starting from a given object. This request is asynchronous, that is, the browser client continues to respond to user interaction until it receives the response from the server application. The client processes the server response which includes graph data containing information about all the objects (the graph nodes) and how they are related (the graph edges). As a result of the graph generating process on the server application, the set of objects in the response is ordered starting with the root object followed by its children objects and then followed by their children objects, and so on. This allows the graph to be rendered in a hierarchical layout, with the root object at the top or to the left, with the first level of child objects arranged together on the same level, and their descendant objects to be arranged on the next level. The sequence of objects provided by the server application is as if the graph structure had been traversed in a breadth-first manner. This also allows the object list view to be populated, simply by creating and displaying presentation objects in the order in which they are received from the server application. The object list is used by the graph drawing process and the list rendering process of the client.

The browser client receives the object graph data, and for each object in the object graph data, the browser client creates an entity object with the unique ID associated with it (supplied by the server application). Properties are added to the entity object (e.g., name, image and type, and whether it is currently highlighted or selected (by default not selected)). The entity object is added to the object list, indexed by its unique ID. The object list is then used as the source to draw the objects in the graph view and the objects in the list view. In one example, the graph view is drawn first, followed by the list view if it is activated.

An example operation of an embodiment of the client rendering function 19A is now described. After the object list is populated with information about each graph object, the graph is drawn first and the list view is rendered next, although the order is not important. The list view is rendered as follows:

Remove the existing list contents.
For each entity object in the object list:
Retrieve the entity object from the object list.
Create a display element to contain the object data (an HTML DIV element), and set style information as required to indicate it is a list element.
Create display elements for the image and text of the object, and set style information according to whether the object is highlighted or selected.
Make the display elements for the object children of the container display element.
Connect a function to handle mouse over events to the display element for the list object.
Connect a function to handle mouse out events to the display element for the list object.

When the list is rendered, if an object is selected or highlighted it will be indicated as such according to the style information associated with the corresponding display elements. For example, a selected object might by colored, e.g., in purple, or a highlighted object might have a yellow outline. A mouse event handler function controls how the style of the object in the list view changes, whether a tooltip is displayed and how such changes are reflected in the graph view. A handler function for mouse over events changes the style of the list object so that it is highlighted and also displays a pop-up window or tooltip to provide more information about the object. The handler function for mouse over will also lookup the entity in the object list by its unique ID and call another function to update the corresponding display object style in the graph view. In this way, the list view and graph view appear to be synchronized. The graph drawing function also connects mouse event handler functions to each graph object such that a change in the style of an object in the graph view is reflected in the list view.

The handler function for the mouse out event (when the mouse cursor moves beyond the boundary of the list object) hides the tooltip if one is showing and changes the style of the display element for the list object to remove its highlight style. As for the mouse over event handling, the mouse out handler function also identifies the corresponding object in the graph view and updates its display attributes to remove the highlight.

As the content of the list view is generated by HTML, it can be navigated easily by using ordinary browser navigation techniques, in addition to clicking on individual graph elements. For example, graph elements can be reached by pressing a keyboard tab key, repeatedly, and graph elements can be selected by pressing the escape key. Screen readers can read HTML text elements of the list view directly and vocalize for hearing. As a result, visually impaired users can interact with the graph data, understanding what there is and performing the same actions as sighted users on the graphical view. The invention enables standard screen readers to articulate (e.g., vocalize) the contents of a graph that cannot be normally read. A user is provided with a way for a screen reader to present the user with the list of objects in the displayed graph so that the user can perform actions on those objects and obtain information about those objects.

There is no dependency on the server application 14 for the content of the list view. Specifically, the list generating function 17A and the list rendering function 19A derive list view contents from the same source as the main graphical view (i.e., the lightweight object data from the application server). As such, the source of the list view contents is the graph coordinate data generated and received from the server application. The server does not generate the list view content, the client does. The object data from the application server (coordinates, relationships, labels, etc.) is used to generate the graph view representation and the list view content. Further, the generating function 17A and the list rendering function 19A may arrange (order) the entries in the list view of graph objects according to the depth of each object relative to the root object, such that an indication of the structure of the graph can be provided in the list view. One example arrangement is a hierarchical arrangement of the list view entries 81 according to the depth of each object relative to the root object, such that an indication of the structure of the graph can be provided in the list view corresponding to the edges in the graph view.

Information regarding name and type of each object in the list view is the same as that in the main graphical view. The list view can be navigated using standard controls such as scroll bars. This is beneficial when the current graphical view is such that not many objects are visible, wherein the list view can be quickly scrolled through to find an object of interest, and are used to center the graph around the object of interest. In one embodiment, the list order reflects the order of objects in the graphical view as if the graph had been traversed from the root object in a breadth-first order. The adjacency of two objects in the list does not necessarily mean they are connected by a relationship, but they are in close proximity on the graph (the list arrangement (order) need not mean that objects are related, rather they are listed in the order they are represented in the graph according to a breadth-first traversal from the root object). For example, start with the root object at level 0, then visit each of its child objects in turn (at level 1) adding them to the list, then visiting their child objects, and so on (the arrangement of the list does not necessarily mean adjacent objects are related). In another embodiment, alternative representations of the list view may indicate (e.g., via labels, links) which objects are related to each other.

Figure 16A:
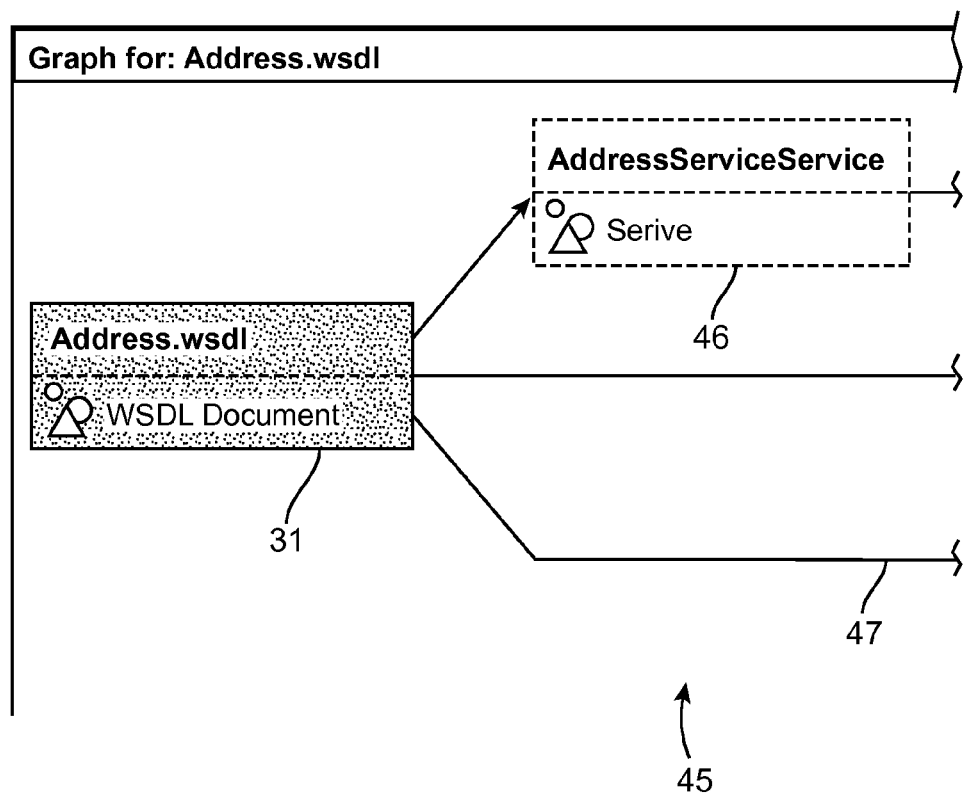
Figure 16B:
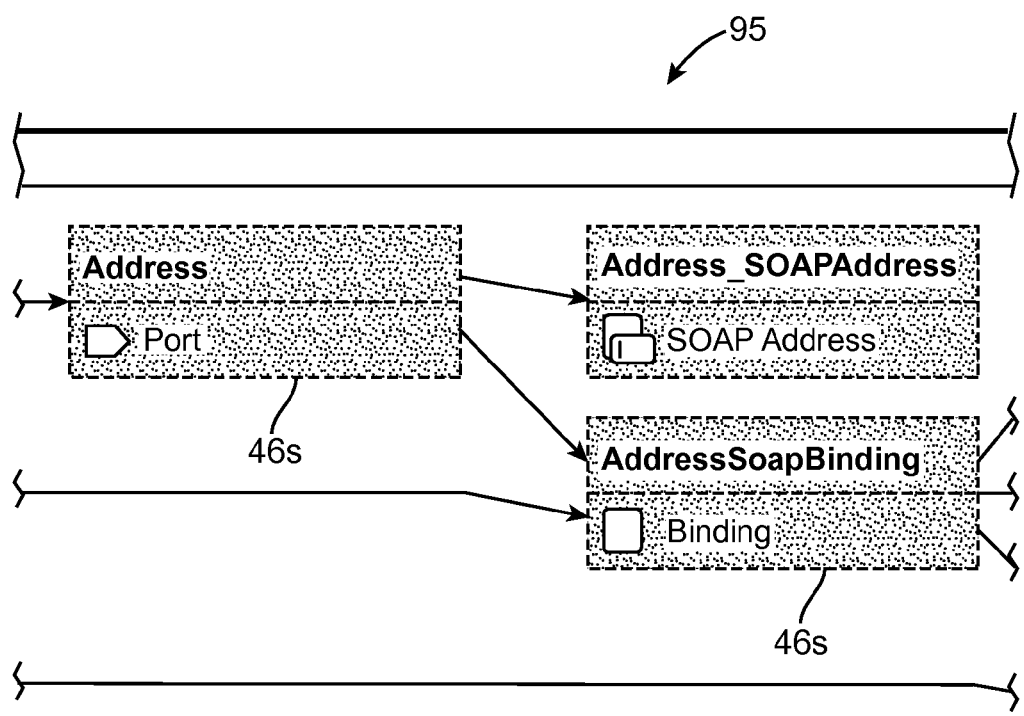
Figure 16C:
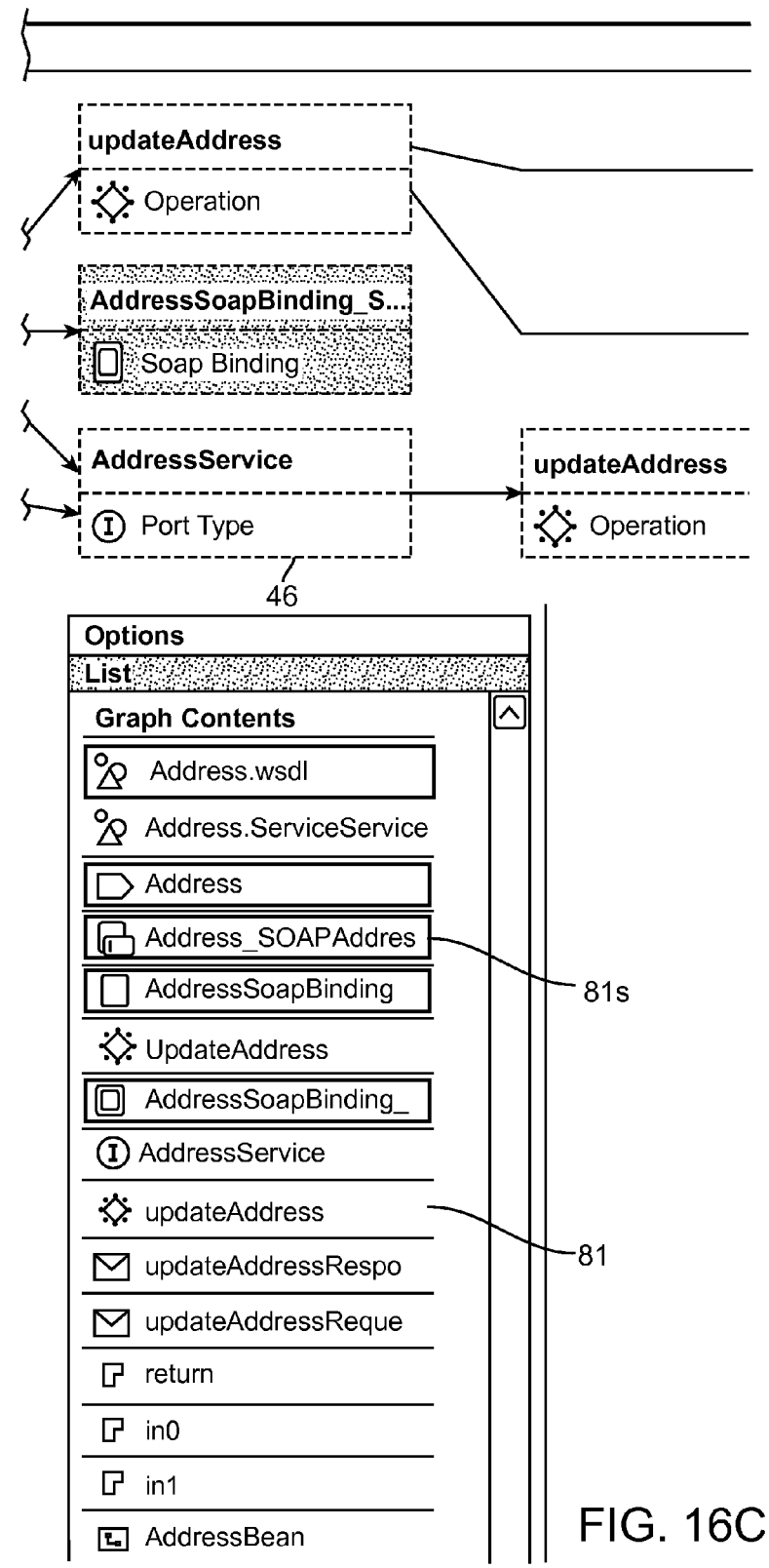

The list view allows users to understand and navigate the graph structure in an accessible way. The elements of the list view are directly synchronized to the corresponding elements in the graph display. As the data changes or is selected in one (graph view or list view), the same change or selection is reflected in the other. The graph view and the list view are synchronized, wherein the textual representation is fully expanded (not requiring user involvement) and can be used to perform actions on the graph objects, as well as, browsing the graph structure. Deleting an object in the list view deletes the object in the graph view and vice-versa. Adding an object in the list view adds the object in the graph view and vice-versa. The graph view or the list view may be used to control the selection of objects in the dataset or to navigate the graph structure. A graph object may be deleted either from the graph view or the list view. FIGS. 16A-C shows a view 95 including a graph view 45 and corresponding list view 90 on the same display.

According to embodiments of the invention, the graph view and list view drawing capabilities are not dependent on a specific operating system or on proprietary vendor plug-ins/components. There is no need to purchase, install, or maintain a specific application or plug-in component on every client (the results are directly available by making a web request from the server). Although in the examples above, the client utilizes a web browser, those skilled in the art will recognize that the invention is useful with other user interface modules and presentation modules that need not be browser based.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

Figure 17:
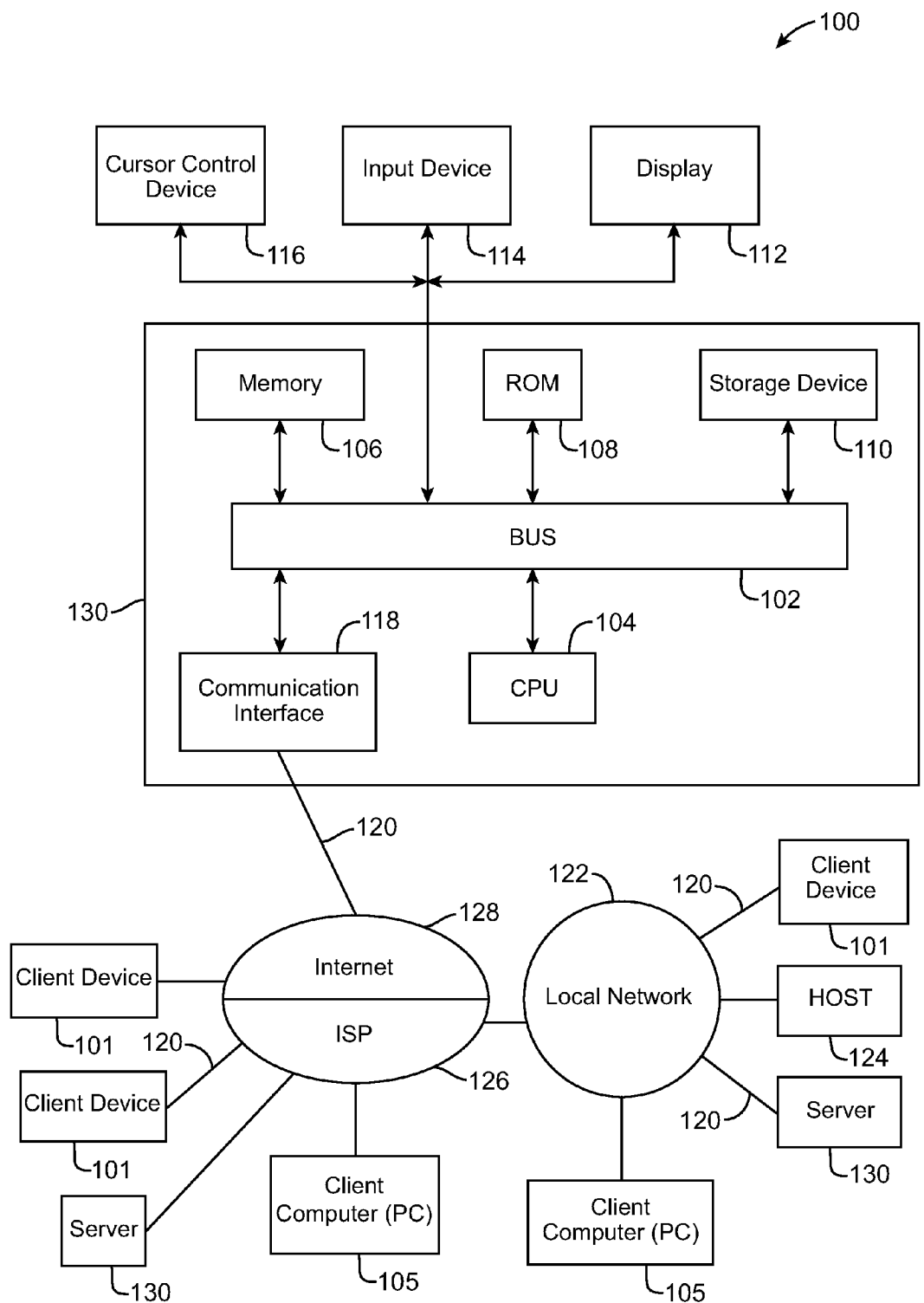
FIG. 17 shows a functional block diagram of an example computing environment implementing an embodiment of the invention.

FIG. 17 shows a block diagram of an example architecture of an embodiment of a system 100 configured to perform the processes described above, according to an embodiment of the invention. The system 100 includes one or more client devices 101 connected to one or more server computing systems 130. A server 130 includes a bus 102 or other communication mechanism for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type or user input device comprises cursor control 116, such as a mouse, a trackball, or cursor direction keys for communicating direction information and command selections to the processor 104 and for controlling cursor movement on the display 112.

According to one embodiment of the invention, the functions of the invention are performed by the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for generating views of data on a user interface in a computing environment, comprising:
   at a server, a first hardware processor employed for:
      generating coordinate data for a graph representing multiply connected objects; and
      transmitting the coordinate data to a client as lightweight object data;
   at the client, based on the lightweight object data, a second hardware processor employed for:
      rendering an interactive dynamic graph view of the multiply connected objects on a user interface;
      rendering an interactive dynamic list view of the multiply connected objects on a user interface; and
      synchronizing the list view and the graph view.

2. The method of claim 1, wherein rendering an interactive dynamic list view of the multiply connected objects on a user interface further includes displaying object graph content in a linear manner in a web browser client, wherein the order of objects in the list view reflects the order of objects in the graph view per a breadth-first traversal starting at a root object.

3. The method of claim 1, wherein synchronizing the list view and the graph view further includes:
   in response to a change in an object in the graph view, changing a corresponding entry in the list view accordingly to reflect the change in the graph view such that the views are synchronized; and
   in response to a change in an object in the list view, changing a corresponding entry in the graph view accordingly to reflect the change in the list view such that the views are synchronized.

4. The method of claim 3, further including: at the client, employing the second hardware processor for receiving user input for selecting a view object as an object of focus, and displaying content of the selected object on the user interface.

5. The method of claim 4, further including: at the client, employing the second hardware processor for receiving user input for navigating through the multiply connected objects in a view.

6. The method of claim 4, further including:
   at the server, employing the first hardware processor for:
      retrieving data units and data unit relationships from a data source, then generating coordinate data for a graph including data objects representing the data units, and connections between the objects representing the corresponding data unit relationships; and
      transforming the coordinate data to a client to lightweight object data for transmission to the client;
   at the client, based on the lightweight object data, employing the second hardware processor for:
      rendering an interactive dynamic graph view of the multiply connected objects, wherein the graph includes visual elements connected by edges, such that the visual elements represent the objects and the edges represent relationships between the objects; and rendering an interactive dynamic list view of the multiply connected objects, wherein the list includes visual elements and arrangement of such visual elements, such that the list visual elements represent the objects and the arrangement represents relationships between the objects.

7. The method of claim 6, wherein the computing environment comprises a service-oriented architecture and the data source comprises a service registry.

8. The method of claim 6, wherein the client comprises a web browser on a thin client computing module, the server comprises a server application on a server computing module, wherein the client module and the server module may be connected via a communication link.

9. A computer program product for generating views of data on a user interface in a computing environment, comprising a non-transitory computer usable medium including a computer readable program including program instructions, wherein the computer readable program, when executed on a computer system causes the computer system to:

employ a first hardware processor at a server to generate coordinate data for a graph representing multiply connected objects and transmit the coordinate data to client as lightweight object data;

at the client, based on the lightweight object data, employ a second hardware processor for rendering an interactive dynamic graph view of the multiply connected objects on a user interface;

at the client, based on the lightweight object data, employ the second hardware processor for:

rendering an interactive dynamic list view of the multiply connected objects on a user interface; and synchronizing the list view and the graph view.

10. The computer program product of claim 9 further including instructions for displaying object graph content in a linear manner in a web browser client.

11. The computer program product of claim 9 further including instructions for:

in response to a change in an object in the graph view, changing a corresponding entry in the list view accordingly to reflect the change in the graph view such that the views are synchronized; and in response to a change in an object in the list view, changing a corresponding entry in the graph view accordingly to reflect the change in the list view such that the views are synchronized.

12. The computer program product of claim 11 further including instructions for:

at the client, employing the second hardware processor for receiving user input for selecting a view object as an object of focus, and displaying content of the selected object on the user interface.

13. The computer program product of claim 12 further including instructions for: at the client, employing the second hardware processor for receiving user input for navigating through the multiply connected objects in a view.

14. The computer program product of claim 13 further including instructions for:

at the server, employing the first hardware processor for:

retrieving data units and data unit relationships from a data source, then generating coordinate data for a graph including data objects representing the data units, and connections between the objects representing the corresponding data unit relationships; and transforming the coordinate data to a client to lightweight object data for transmission to the client;

at the client, based on the lightweight object data, employing the second hardware processor for:

rendering an interactive dynamic graph view of the multiply connected objects, wherein the graph includes visual elements connected by edges, such that the visual elements represent the objects and the edges represent relationships between the objects; and rendering an interactive dynamic list view of the multiply connected objects, wherein the list includes visual elements and arrangement of such visual elements, such that the list visual elements represent the objects and the arrangement represents relationships between the objects.

15. The computer program product of claim 14, wherein the computing environment comprises a service-oriented architecture and the data source comprises a service registry, wherein the order of objects in the list view reflects the order of objects in the graph view per a breadth-first traversal starting at a root object.

16. The computer program product of claim 14, wherein the client comprises a web browser on a thin client computing module, the server comprises a server application on a server computing module, wherein the client module and the server module may be connected via a communication link.

\* \* \* \* \*